(12) United States Patent
Roeygaard et al.

(10) Patent No.: US 12,646,384 B2
(45) Date of Patent: Jun. 2, 2026

(54) SELF-SERVICE LOTTERY TICKET SELLING SYSTEMS AND METHODS OF OPERATION THEREOF

(71) Applicant: Brightstar Global Solutions Corporation, Providence, RI (US)

(72) Inventors: Michael Roeygaard, Rome (IT); Apostolos D. Kallis, Barrington, RI (US); Henry Constant, West Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 338 days.

(21) Appl. No.: 18/479,325

(22) Filed: Oct. 2, 2023

(65) Prior Publication Data

US 2025/0111754 A1 Apr. 3, 2025

(51) Int. Cl.
| | |
|---|---|
| *G07F 17/32* | (2006.01) |
| *G06Q 20/04* | (2012.01) |
| *G06Q 20/18* | (2012.01) |
| *G06Q 20/20* | (2012.01) |
| *G06Q 50/34* | (2012.01) |

(52) U.S. Cl.
CPC ......... *G07F 17/329* (2013.01); *G06Q 20/045* (2013.01); *G06Q 20/18* (2013.01); *G06Q 20/208* (2013.01); *G06Q 50/34* (2013.01)

(58) Field of Classification Search
CPC .... G07F 17/329; G06Q 20/045; G06Q 20/18; G06Q 20/208; G06Q 50/34
See application file for complete search history.

(56) References Cited

U.S. PATENT DOCUMENTS

| | | | |
|---|---|---|---|
| 4,833,307 A | 5/1989 | Gonzalez-Justiz | |
| 2004/0050925 A1* | 3/2004 | Collins | G07F 17/42 |
| | | | 235/375 |
| 2004/0242309 A1 | 12/2004 | Melesko et al. | |
| 2015/0339893 A1 | 11/2015 | Sun | |
| 2017/0007916 A1* | 1/2017 | Modawell | B41F 5/24 |
| 2018/0330571 A1* | 11/2018 | Jones | G07F 17/42 |

OTHER PUBLICATIONS

@lotterytipsinstantstrategi2828, How To Select Lottery Games From the Machine, Aug. 26, 2023, screenshots of video available at <<https://www.youtube.com/shorts/QELYZT52AqU>>. (Year: 2023).*
@MommySonicAdventures, California Lottery Kiosk SuperLotto, Sep. 23, 2022, screenshots of video available at <<https:// www. youtube.com/shorts/Zv6sMBHf8t8>>. (Year: 2022).*
"Altura Lottery Terminal Retailer Reference Guide", North Carolina Education Lottery, Jul. 2016.
"Example of PhotonX Lottery Terminal", available before the priority date of this patent application.
"Example of Scientific Games Lottery Terminal", available before the priority date of this patent application.

(Continued)

*Primary Examiner* — Werner G Garner
(74) *Attorney, Agent, or Firm* — Neal, Gerber & Eisenberg LLP

(57) ABSTRACT

Self-service lottery ticket selling systems and methods of operating such systems that enable the purchase of draw lottery tickets by players without the assistance of a retail clerk, lottery terminal operator, or other person operating the lottery terminal.

20 Claims, 19 Drawing Sheets

(56) References Cited

OTHER PUBLICATIONS

"Examples of IGT/IGT Global Solutions Lottery Terminals", available before the priority date of this patent application.
"Examples of Intralot Lottery Terminals", available before the priority date of this patent application.
"IGT's GameTouch 20", product literature available before the priority date of this patent application.
"IGT's GameTouch 28", product literature available before the priority date of this patent application.
"IGT's GameTouch Draw S2 Self-Service Machine", product literature available before the priority date of this patent application.
"Pictures of Gaming Systems", available before the priority date of this patent application.

* cited by examiner

10

12

MICHIGAN

DRAW LOTTERY GAME

PRINTED SEPTEMBER 30, 2023  06:09:04 PM          14

Your Numbers 14    47    54    55    68              (25)          15

Drawing on WED       OCTOBER 6, 2023          $2.00

015018  OCTOBER 6, 2023  18:09:04  10617800

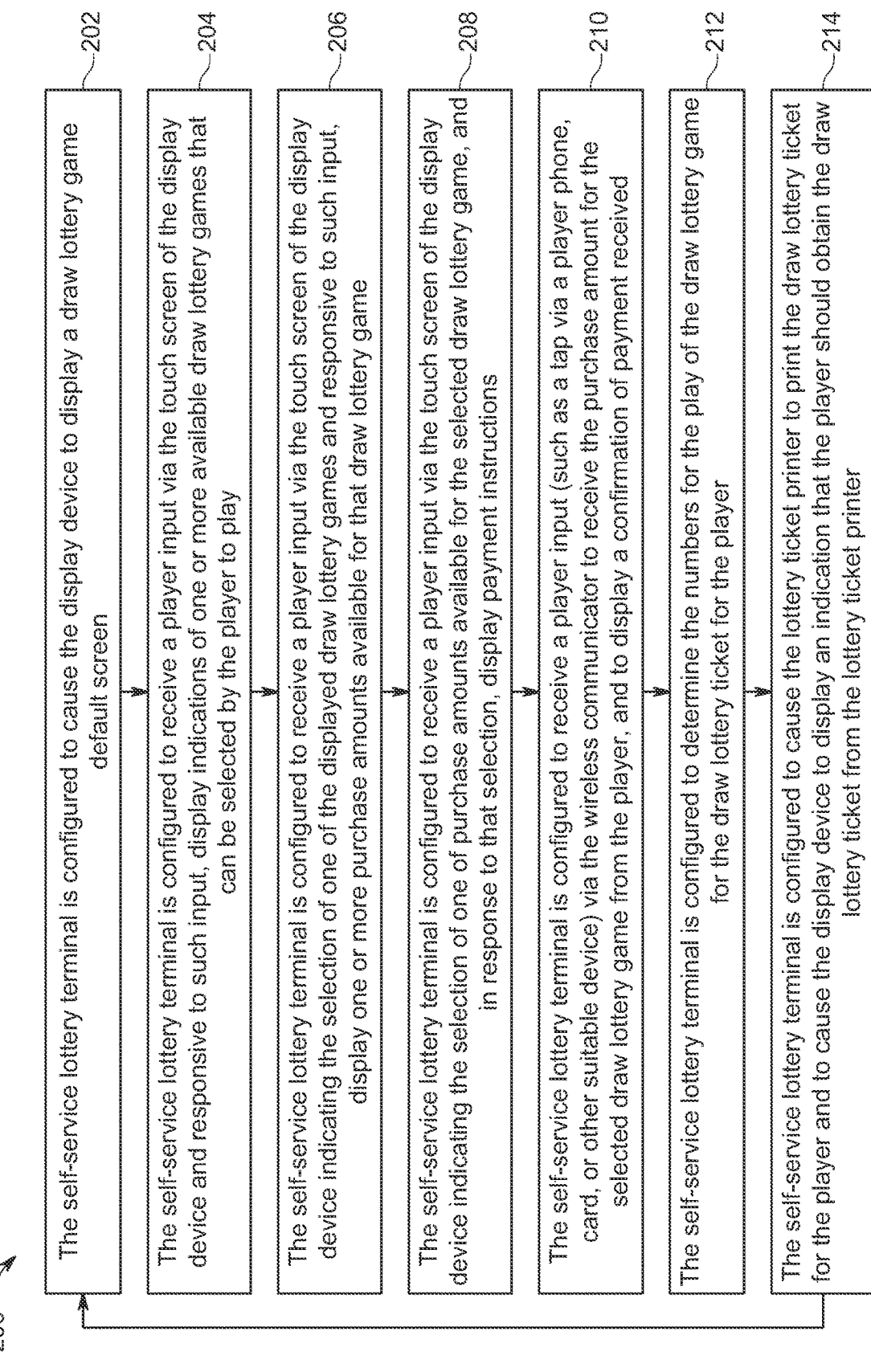

200

The self-service lottery terminal is configured to cause the display device to display a draw lottery game default screen
202

The self-service lottery terminal is configured to receive a player input via the touch screen of the display device and responsive to such input, display indications of one or more available draw lottery games that can be selected by the player to play
204

The self-service lottery terminal is configured to receive a player input via the touch screen of the display device indicating the selection of one of the displayed draw lottery games and responsive to such input, display one or more purchase amounts available for that draw lottery game
206

The self-service lottery terminal is configured to receive a player input via the touch screen of the display device indicating the selection of one of purchase amounts available for the selected draw lottery game, and in response to that selection, display payment instructions
208

The self-service lottery terminal is configured to receive a player input (such as a tap via a player phone, card, or other suitable device) via the wireless communicator to receive the purchase amount for the selected draw lottery game from the player, and to display a confirmation of payment received
210

The self-service lottery terminal is configured to determine the numbers for the play of the draw lottery game for the draw lottery ticket for the player
212

The self-service lottery terminal is configured to cause the lottery ticket printer to print the draw lottery ticket for the player and to cause the display device to display an indication that the player should obtain the draw lottery ticket from the lottery ticket printer
214

FIG. 3

DRAW GAME 2
$ 1  $ 5  $ 10
$ 78 Million

SELF-SERVICE LOTTERY TICKET SELLING SYSTEMS AND METHODS OF OPERATION THEREOF

BACKGROUND

The present disclosure relates to self-service lottery ticket selling systems and methods of operation thereof.

For a draw lottery ticket for a draw lottery game, a player may select the player numbers or may have an electronic lottery system randomly select the player numbers (which is often referred to as a quick pick). Draw lottery tickets may be purchased in variety of different manners using a variety of different systems such as systems that include lottery terminals controlled by operators. Various different jurisdictions (such as states) have different rules regarding how such draw lottery tickets can be purchased.

BRIEF SUMMARY

In various embodiments, the present disclosure relates to a self-service lottery ticket selling system including: a lottery ticket printer configured to print draw lottery tickets; a data receiver/transmitter configured to communicate with a central lottery system via a data communication network; and a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer, wherein the self-service lottery terminal is configured to enable a purchase of a draw lottery ticket by a player without the assistance of any operator of the self-service lottery terminal.

In various other embodiments, the present disclosure relates to a self-service lottery ticket selling system including: a lottery ticket printer configured to print draw lottery tickets; a data receiver/transmitter configured to communicate with a central lottery system via a data communication network; and a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer. The self-service lottery terminal is configured to: enable a purchase of a draw lottery ticket by a player without the assistance of any operator of the self-service lottery terminal; display, via the display device, an indication of an input configured to cause the draw lottery ticket to be printed by the lottery ticket printer; and display, via the display device, a code readable by an electronic player device that enables the player electronic device to cause the draw lottery ticket to be downloaded.

In various other embodiments, the present disclosure relates to a self-service lottery ticket selling system including: a lottery ticket printer configured to print draw lottery tickets; a data receiver/transmitter configured to communicate with a central lottery system via a data communication network; and a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/ transmitter and to the lottery ticket printer. The self-service lottery terminal is configured to: simultaneously display, via the display device, indications corresponding to different draw lottery games and different purchase amounts for the draw lottery games; display, via the display device, an indication of one of the purchase amounts for a play of one of the draw lottery games corresponding to a player input via the touch screen of the display device indicating a selection of that purchase amount for the play of the draw lottery game, wherein the player input also indicates a selection of the draw lottery game; determine the numbers for the play of the draw lottery game or receive the numbers for the play of the draw lottery game; display, via the display device, payment instructions for that purchase amount for the play of the draw lottery game; display, via the display device, a payment confirmation for that purchase amount for the draw lottery game after receiving a player input via the wireless communicator for that purchase amount for the play of the draw lottery game; simultaneously display, via the display device, an indication of an input configured to cause the draw lottery ticket to be printed by the lottery ticket printer, and a code readable by an electronic player device that enables the player electronic device to cause the draw lottery ticket to be downloaded; and cause the lottery ticket printer to print the draw lottery ticket for the play of the draw lottery game responsive to a player input to cause the draw lottery ticket to be printed by the lottery ticket printer.

Additional features are described in, and will be apparent from, the following Detailed Description and the figures.

BRIEF DESCRIPTION OF THE SEVERAL VIEWS OF THE DRAWINGS

FIG. 3 is a flow diagram showing one example method of operation of the self-service lottery ticket selling system of FIG. 2 in accordance with one example embodiment of the present disclosure.

DETAILED DESCRIPTION

In various embodiments, the present disclosure relates to self-service lottery ticket selling systems and methods of operating the self-service lottery ticket selling systems. In various such embodiments, the self-service lottery ticket selling system includes a self-service lottery terminal, a data receiver/transmitter (that can be part of the lottery terminal or separate from the lottery terminal), a lottery ticket printer (that can be part of the lottery terminal or separate from the lottery terminal), and a central lottery system. In various embodiments, the self-service lottery ticket selling system enables the purchase of draw lottery tickets by players without the assistance of a retail clerk, lottery terminal operator, or other person operating the self-service lottery terminal.

Draw lottery tickets for draw lottery games are employed as example lottery tickets herein; however, it should be appreciated that the present disclosure is not meant to be limited by such examples. For a better understanding of the present disclosure, an example draw lottery ticket is first described herein.

A draw lottery ticket can include: (1) a single set of player symbols (such as numbers) for a single play of a draw lottery game; (2) multiple sets of player symbols (such as numbers) for a single play of a draw lottery game; (3) a single set of player symbols (such as numbers) for each of multiple plays of a draw lottery game; or (4) multiple sets of player symbols (such as numbers) for each of multiple plays of a draw lottery game. For simplicity, the present disclosure uses a draw lottery ticket with a single set of player numbers for a single play of a draw lottery game as an example, but it should be appreciated that the present disclosure can be employed for selling various other draw lottery tickets.

Figure 1:
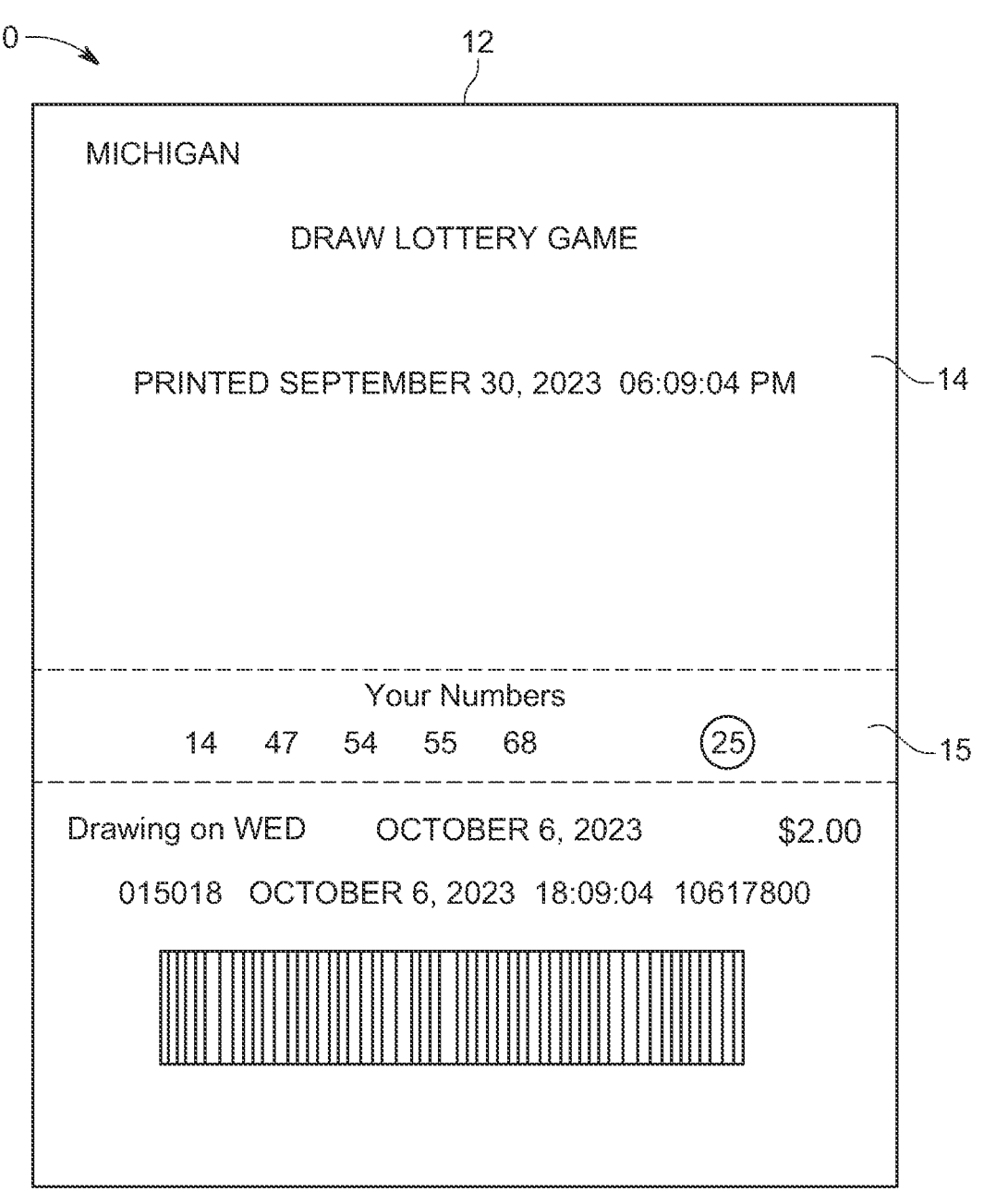
FIG. 1 is front view of an example draw lottery ticket.

Draw lottery tickets can either be physical or virtual. An example physical draw lottery ticket 10 is shown in FIG. 1. This example draw lottery ticket includes: (1) a ticket substrate 12; (2) a front surface 14 of the ticket substrate 12; (3) a single set of player numbers 15 for a single play of draw lottery game) printed on the front surface 14 of the ticket substrate 12; (4) a back surface (not shown) of the ticket substrate 12; and (5) lottery game and ticket information (not labeled) printed on the front surface 14 of the ticket substrate 12. This example draw lottery ticket 10 is for a single play of a draw lottery game scheduled to take place on Wednesday Oct. 6, 2023. The lottery ticket information can include text, one or more ticket numbers, one or more ticket barcodes, and other instant lottery ticket information (not labeled) that is in either or both human readable and machine readable forms. The lottery ticket's barcode (not labeled) is configured to be scanned by a barcode reading device to identification of the draw lottery ticket 10 and enable redemption of such draw lottery ticket 10.

The present disclosure provides self-service lottery ticket selling systems and methods of operation thereof that improve upon the known draw lottery ticket selling systems and methods, and that can be employed in numerous places without the need for a retail clerk, operator, or other person that operates self-service the lottery terminal (and thus that sells or provides the draw lottery tickets to the players).

For purposes of the present disclosure, draw lottery games and draw lottery tickets are meant to include any draw lottery type game or ticket (such as but not limited to known draw lottery games, new draw lottery games, jackpot draw games, lotto draw games, fastplay draw games, quick draw/ monitor games, draw number games, and digital instant lottery games).

First Set of Example Embodiments

Figure 2:
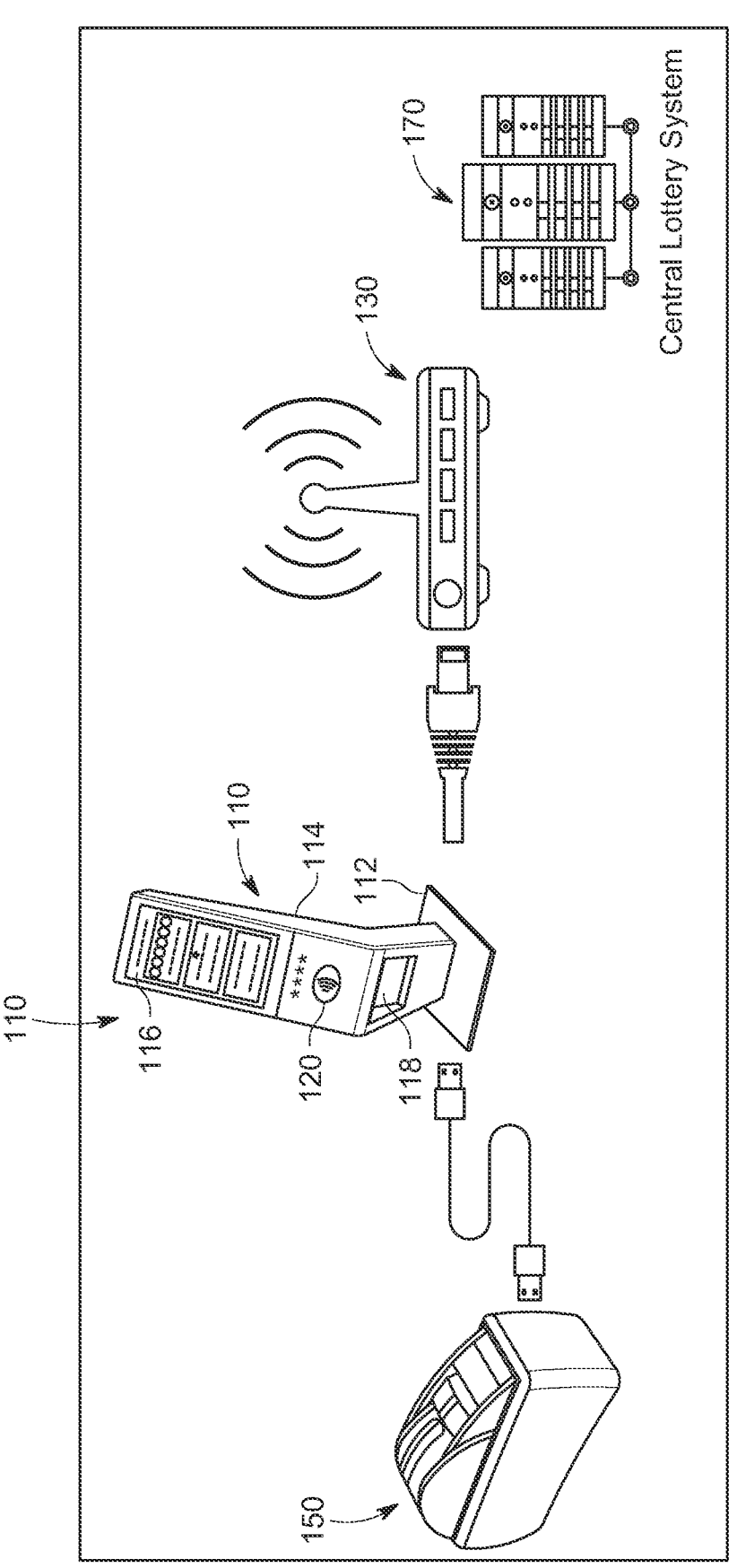
FIG. 2 is a diagrammatic view of a self-service lottery ticket selling system including a self-service lottery terminal, a lottery ticket printer, and a central lottery system in accordance with one example embodiment of the present disclosure.

FIG. 2 illustrates an example self-service lottery ticket selling system 100 of one example embodiment of the present disclosure, FIG. 3 illustrates a method 200 of operating the example self-service lottery ticket selling system 100 in accordance with one example embodiment of the present disclosure, and FIGS. 4A, 4B, 4C, 4D, 4E, and 4F illustrate example interfaces provided by the self-service lottery ticket selling system 100 that enable a player to select, pay for, and obtain a draw lottery ticket via the self-service lottery ticket selling system 100 without the assistance of a retail clerk, operator, or other person. Although the method is described with reference to the flowchart shown in FIG. 3, other methods of performing the acts associated with this illustrated process can be employed in accordance with the present disclosure. For example, the order of certain of the illustrated blocks can be changed, certain of the illustrated blocks may be optional, or certain of the illustrated blocks may not be employed.

This illustrated example embodiment of the present disclosure provides a self-service lottery ticket selling system 100 including: (1) a self-service lottery terminal 110; (2) a data receiver/transmitter 130; (3) a lottery ticket printer 150; and (4) a central lottery system 170.

More specifically, the self-service lottery terminal 110 includes a base 112, a housing 114 connected to an supported by the base 112, a display device 116 mounted in and supported by the housing 114, a code scanner 118 (such as but not limited to a barcode reader) mounted in and supported by the housing 114, a wireless communicator 120 mounted in and supported by the housing 114, and one or more connectors (not shown) configured to enable connection of the self-service lottery terminal 110 to other devices such as the data receiver/transmitter 130 and the lottery ticket printer 150. In the example embodiment, the display device 116 includes a touch screen (not labeled) configured to receive inputs and thus the display device 116 also functions as an input device.

The data receiver/transmitter 130 is configured to communicate with the central lottery system 170 via a suitable data communication network such as a cellular data network or the internet (not shown). The self-service lottery terminal 110 can be connected to the data receiver/transmitter 130 via a hardwire (not labeled) connected at one end to the lottery terminal 110 and at the other end to the data receiver/ transmitter 130. In alternative embodiments, the self-service lottery terminal 110 includes the data receiver/transmitter 130 (such as via being connected to or supported by the housing 114 of the self-service lottery terminal 110). In other alternative embodiments, the self-service lottery terminal 110 wirelessly communicates with the data receiver/transmitter 130.

The lottery ticket printer 150 is configured to print draw lottery tickets. The self-service lottery terminal 110 can be connected to the lottery ticket printer 150 via a hardwire (not labeled) connected at one end to the lottery terminal 110 and at the other end to the lottery ticket printer 150. In alternative embodiments, the self-service lottery terminal 110 includes the lottery ticket printer (such as via being connected to or supported by the housing 114 of the self-service lottery terminal 110). In alternative embodiments, the self-service lottery terminal 110 communicates wirelessly with the lottery ticket printer 150. In other embodiments, the self-service lottery terminal 110 can be configured to communicate with the lottery ticket printer 150 via a suitable data network such as but not limited to a local area network (i.e., a LAN). The lottery ticket printer 150 can be any suitable lottery ticket printer. For this illustrated example embodiment, the configuration, and functions of the lottery ticket printer 150 does not need to change from the conventional configuration and functions of a lottery ticket printer, and is thus not described herein for brevity.

The central lottery system 170 can be any suitable lottery central system. For this illustrated example embodiment, the configuration, and functions of the central lottery system 170 does not need to change from the conventional configuration and functions of a lottery ticket printer, and is thus not described herein for brevity.

The following describes an example method of operation of the lottery ticket selling system 100 with reference to FIGS. 2, 3, 4A, 4B, 4C, 4D, 4E, and 4F.

Figure 4A:
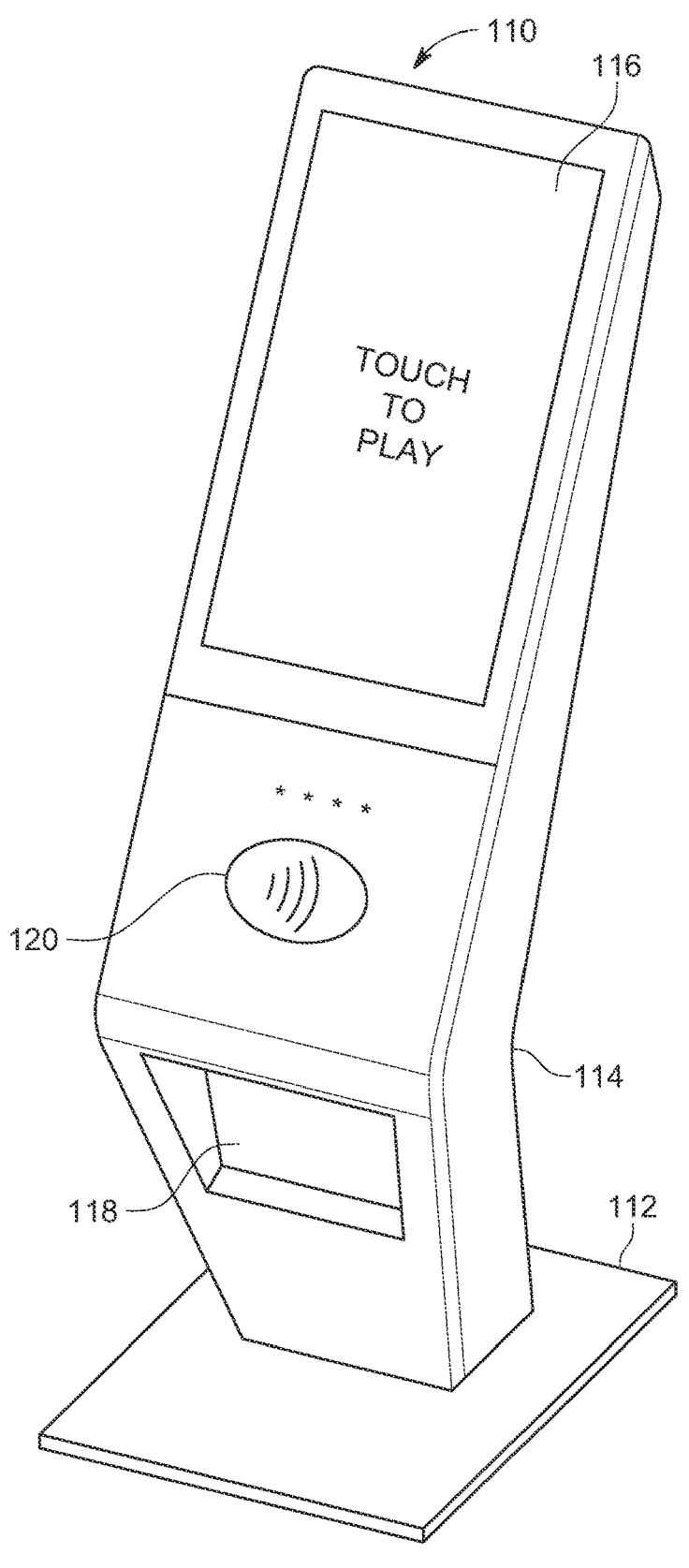
FIGS. 4A, 4B, 4C, 4D, 4E, and 4F are a series of interfaces displayed by the self-service lottery terminal of FIG. 2 in accordance with one example embodiment of the present disclosure.

The self-service lottery terminal 110 is configured to cause the display device 116 to display a draw lottery game default screen, as indicated by block 202. In the example, the display device 116 of the self-service lottery terminal 110 displays the message "TOUCH TO PLAY!" as the draw lottery game default screen, as shown in FIG. 4A.

Figure 4B:
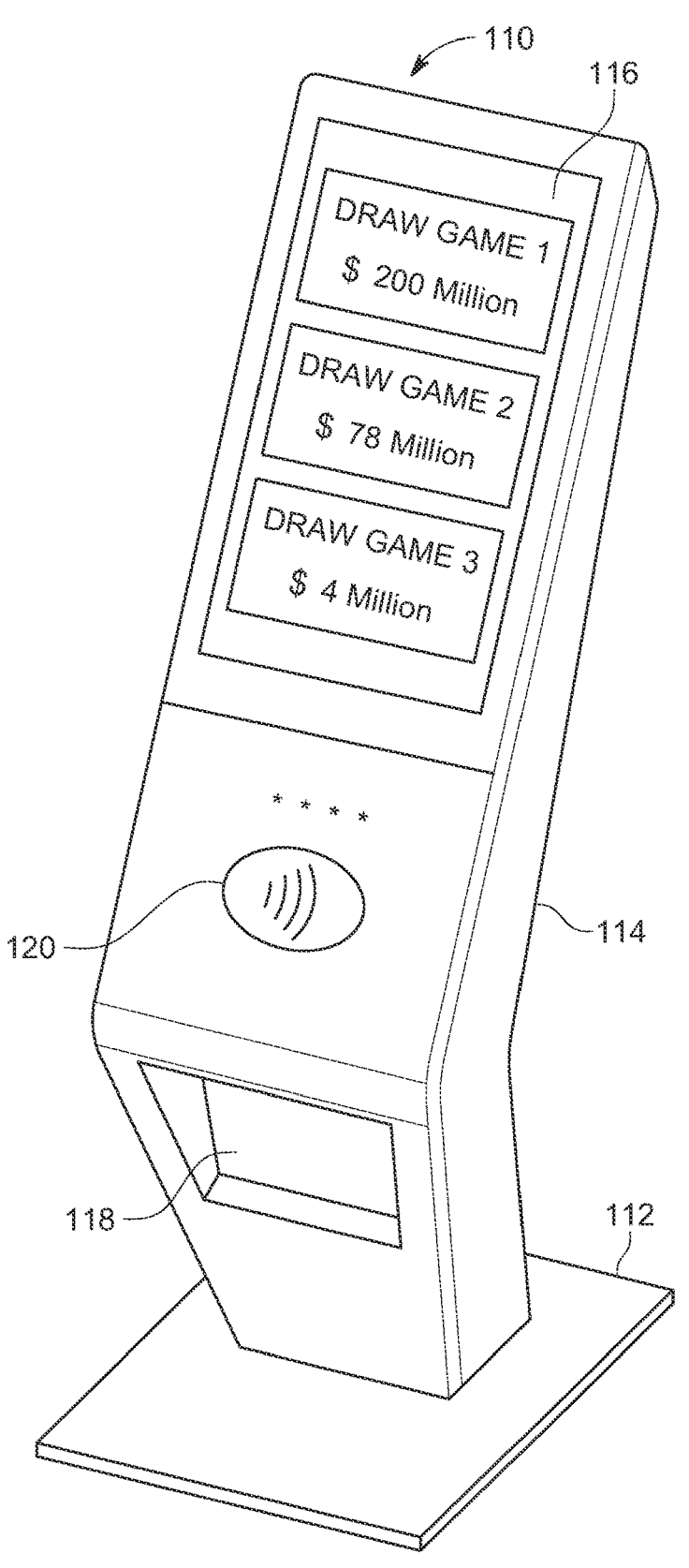

The self-service lottery terminal 110 is configured to receive a player input via the touch screen of the display device 116 and responsive to such input, display indications of one or more available draw lottery games that can be selected by the player to play, as indicated by block 204. In the example, the display device 116 of the self-service lottery terminal 110 displays three indications corresponding to three different draw lottery games (including in this example Draw Game 1, Draw Game 2, and Draw Game 3) and the respective top award amounts that can be won via those draw lottery games, as shown in FIG. 4B.

Figure 4C:
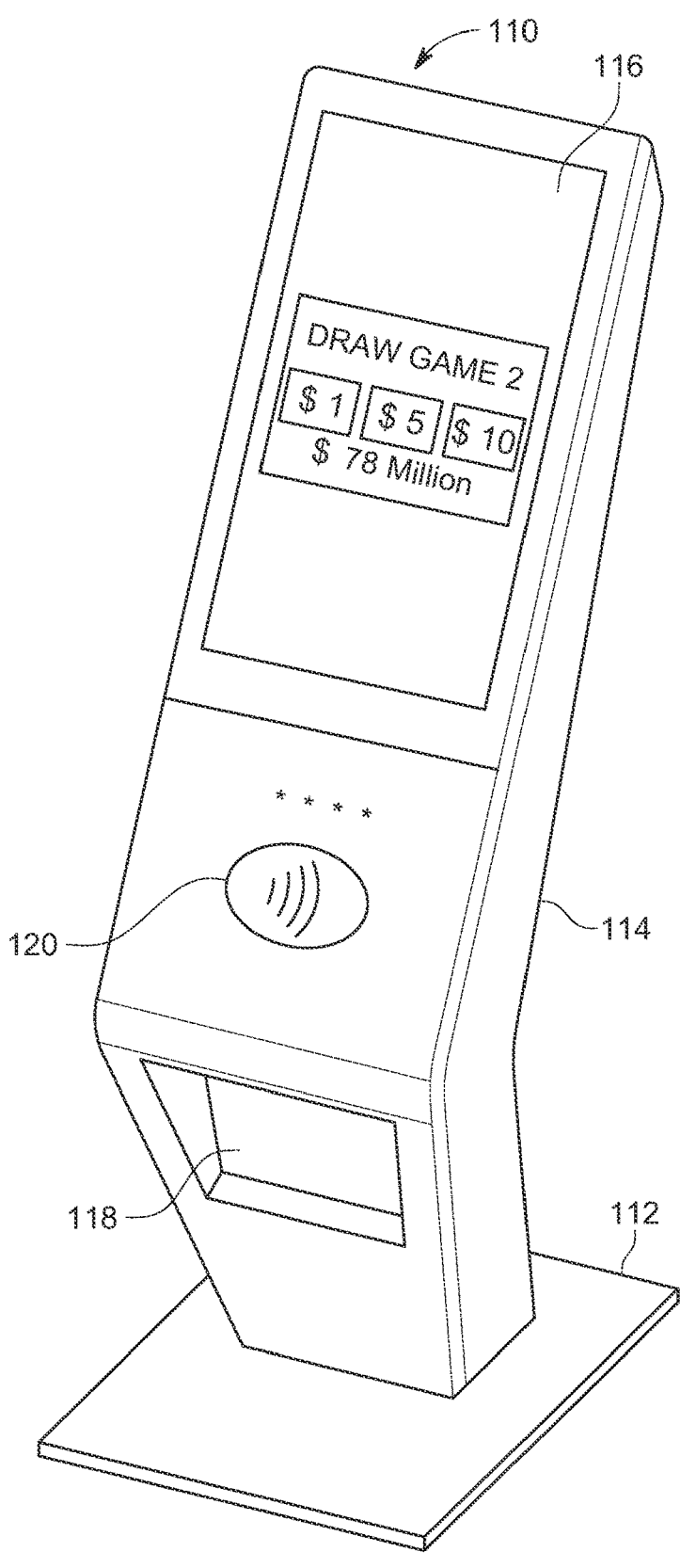

The self-service lottery terminal 110 is configured to receive a player input via the touch screen of the display device 116 indicating the selection of one of the displayed draw lottery games and responsive to such input, display one or more purchase amounts available for that draw lottery game, as indicated by block 206. In this example, the player has selected Draw Game 2 and the display device 116 of the self-service lottery terminal 110 displays three indications corresponding to three different price points for the Draw Game 2 (including in this example $1, $5, and $10), as shown in FIG. 4C. The purchase amounts can be any suitable amounts.

Figure 5A:
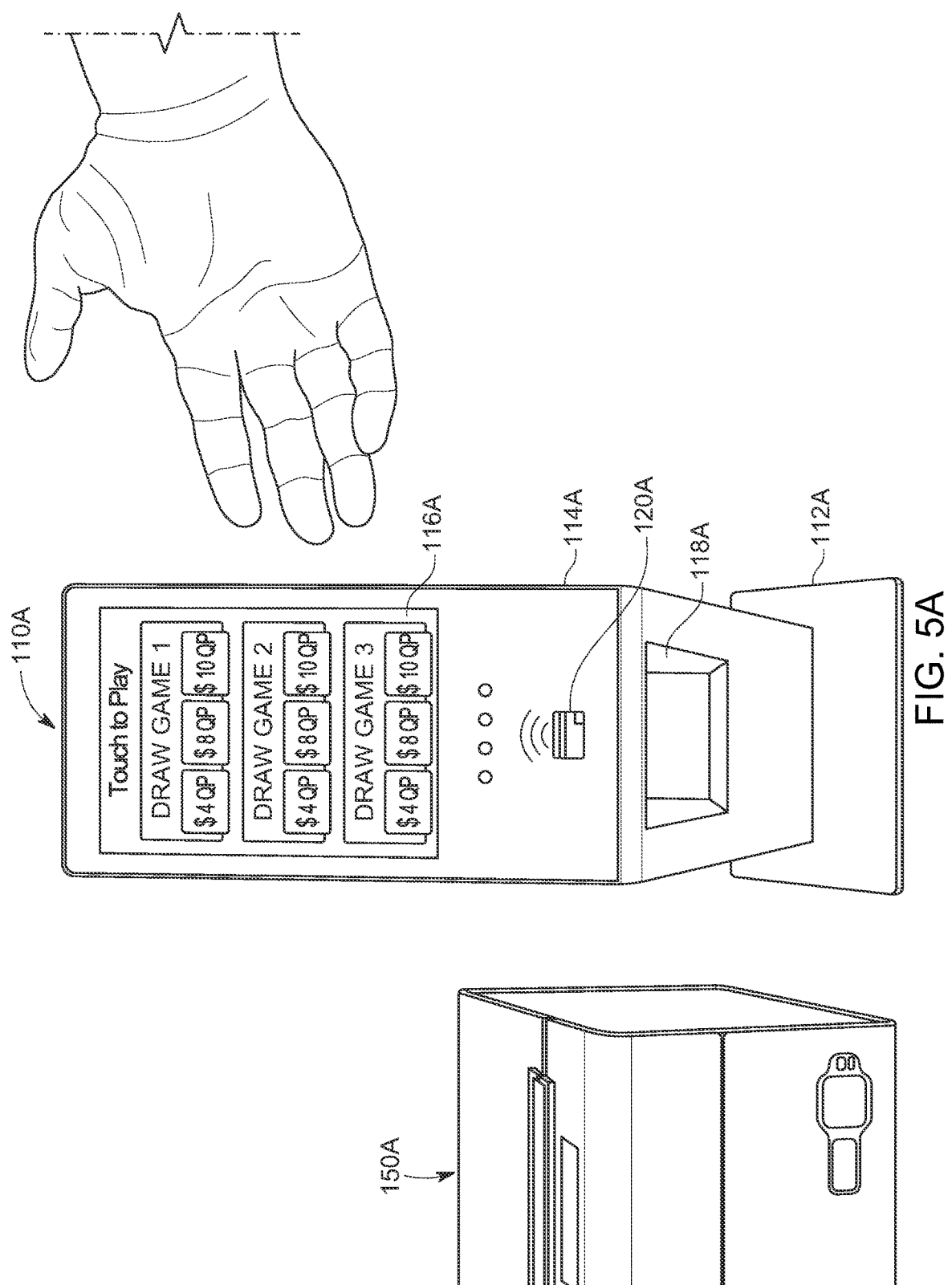
FIGS. 5A, 5B, 5C, 5D, 5E, 5F, 5G, 5H, and 5I show another series of interfaces displayed by the self-service lottery terminal of FIG. 2A and related interaction by the player including interaction by the player using credit card and using a player mobile device in accordance with one example embodiment of the present disclosure.

In alternative embodiments as further discussed below, the self-service lottery terminal can simultaneously display the indications corresponding to different draw lottery games and the respective purchase amounts for each draw lottery game such as shown in FIG. 5A as discussed below. This alternative embodiment enables the player to make a single input selecting both the draw lottery game and the purchase amount for that draw lottery game.

Figure 4D:
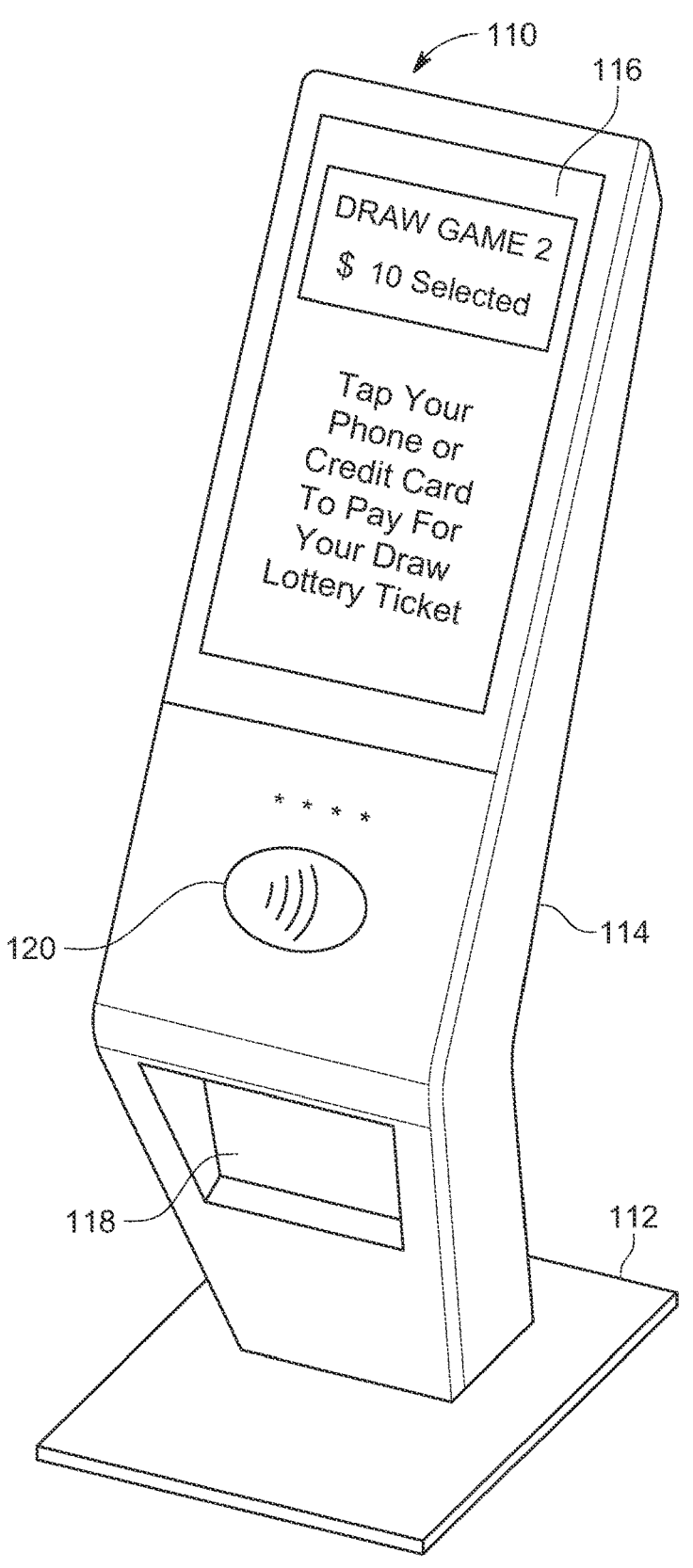

The self-service lottery terminal 110 is configured to receive a player input via the touch screen of the display device 116 indicating the selection of one of purchase amounts available for the selected draw lottery game, and in response to that selection, display payment instructions, as indicated by block 208. In this example, the display device 116 of the self-service lottery terminal 110 displays an indication corresponding to the selected top purchase amount of $10 for the selected draw lottery game and displays payment instructions, as shown in FIG. 4D. In this example, the payment instructions provide "Tap Your Phone or Credit Card to Pay for Your Draw Lottery Ticket" to inform the player that the player can use a credit card or a payment application on their mobile phone to pay for the selected draw lottery ticket. In various embodiments, the cashless payment can be performed using debit/credit types of payments. In various embodiments, the cashless payment can be performed via a lottery or other electronic wallet or payment system (such as provided by existing or new systems).

Figure 4E:
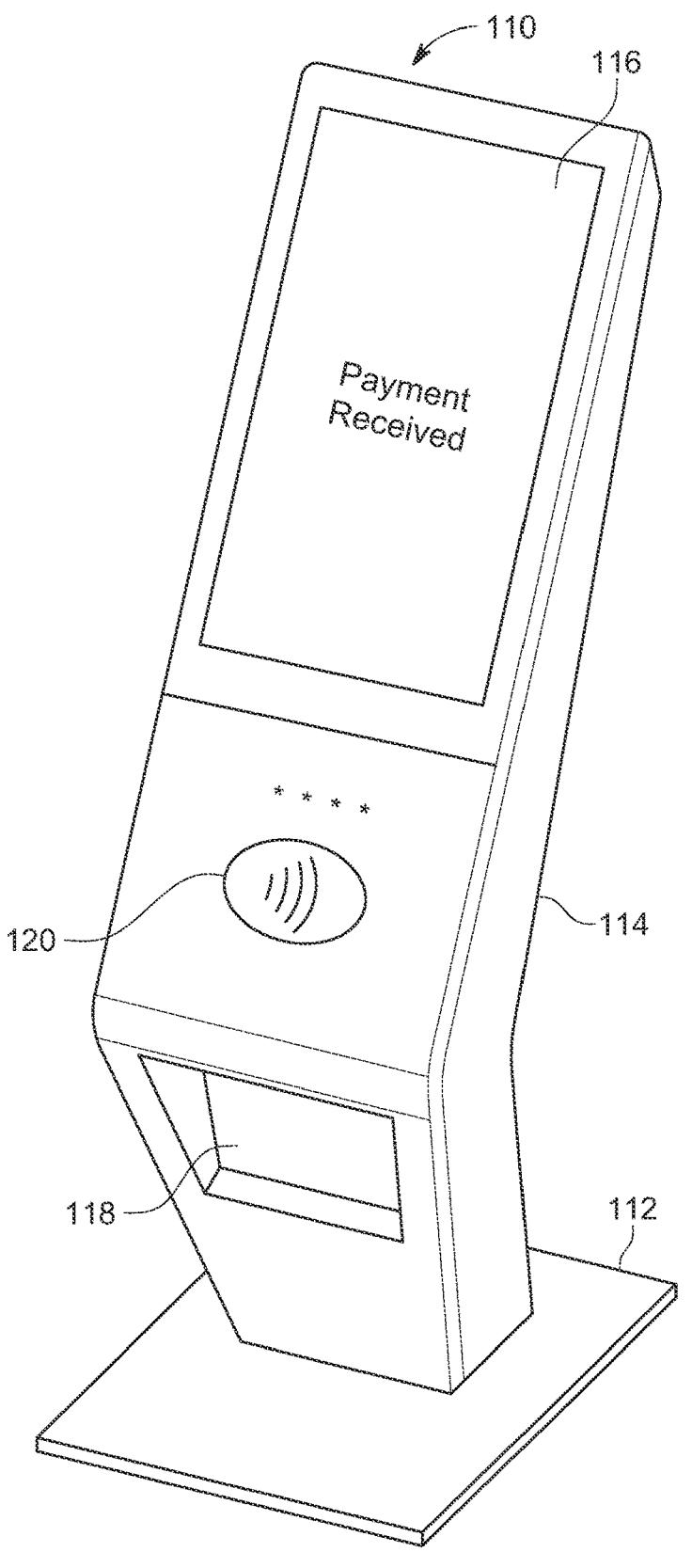

The self-service lottery terminal 110 is configured to receive a player input (such as a tap via a player phone, card, or other suitable device) via the wireless communicator 120 to receive the purchase amount for the selected draw lottery game from the player, and to display a confirmation of payment received, as indicated by block 210. In various embodiments, these payments are PCI compliant types of payments, and/or open loop types of payments. In this example, the display device 116 of the self-service lottery terminal 110 displays an indication corresponding to the selected top purchase amount for the selected draw lottery game and a confirmation of the payment receipt such as "Payment Received," as shown in FIG. 4E.

The self-service lottery terminal 110 is configured to determine the numbers for the play of the draw lottery game for the draw lottery ticket for the player, as indicated by block 212. In various embodiments, the self-service lottery terminal 110 determines the numbers for the draw lottery ticket. In various other embodiments, the self-service lottery terminal 110 obtains the determined numbers for the draw lottery ticket from the central lottery system 170.

Figure 4F:
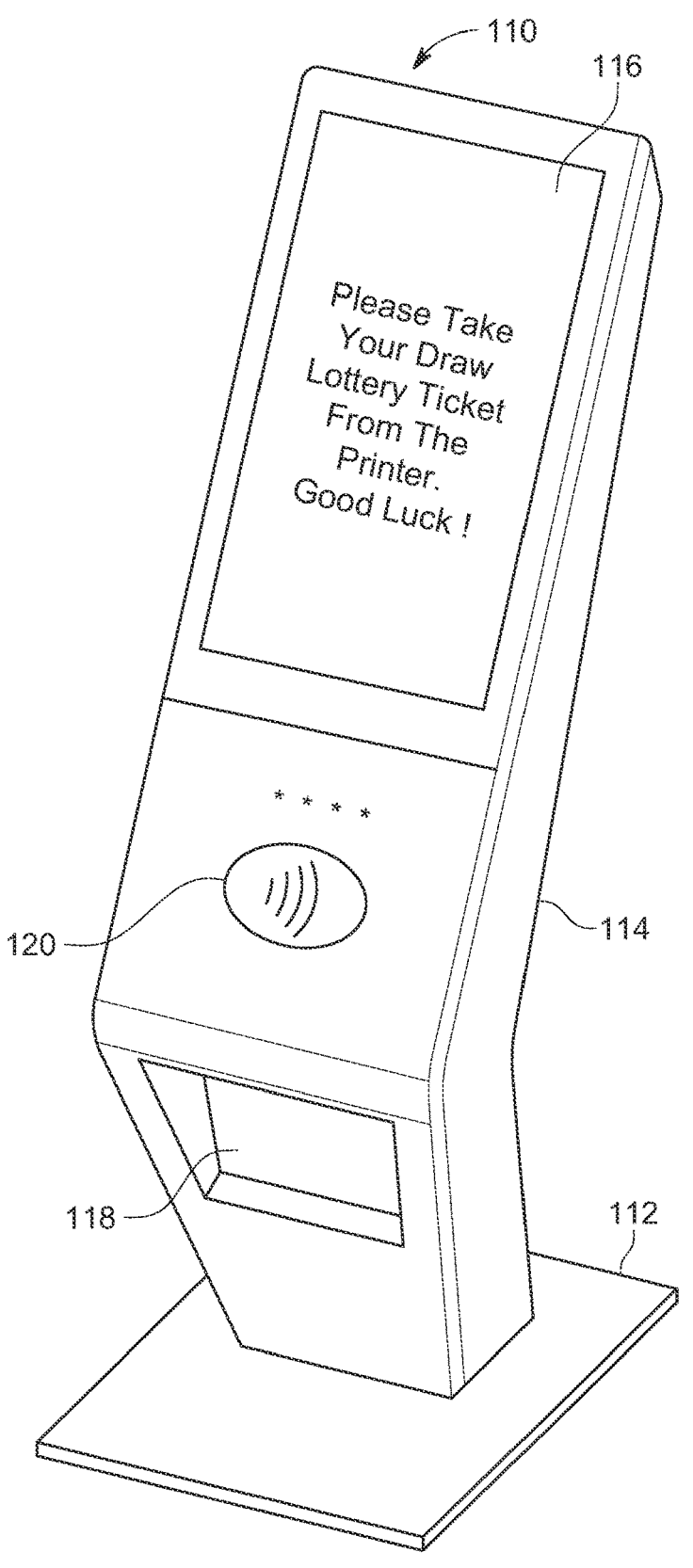

The self-service lottery terminal 110 is configured to cause the lottery ticket printer 150 to print the draw lottery ticket for the player and to cause the display device 116 to display an indication that the player should obtain the draw lottery ticket from the lottery ticket printer 150, as indicated by block 214. In this example, the display device 116 of the self-service lottery terminal 110 displays the message "Please Take Your Lottery Ticket From The Printer. Good Luck!," as shown in FIG. 4F. The player can take the printed draw lottery ticket from the ticket printer 150, which completes the purchase of the draw lottery ticket.

The self-service lottery terminal 110 is configured to then return to the default screen, as indicated by return line back to block 202.

In this first example embodiment, the self-service lottery ticket selling system 100 does not require the player to identify themselves to purchase the draw lottery ticket (other than somewhat indirectly via their payment device and related data). In other embodiments, the self-service lottery ticket selling system of the present disclosure can require the player to identify themselves via one or more different methods before purchasing the draw lottery ticket. In other embodiments, the self-service lottery ticket selling system of the present disclosure can enable but not require the player to identify themselves via one or more different methods before purchasing the draw lottery ticket. In various embodiments, the self-service lottery ticket selling system requires player identification for age verification purposes.

In this first example embodiment, the self-service lottery ticket selling system 100 does not require the player provide an email address, phone number, player account information, or player information before purchasing the draw lottery ticket. In other embodiments, the self-service lottery ticket selling system of the present disclosure can require the player to provide such player information before purchasing the draw lottery ticket. In other embodiments, the self-service lottery ticket selling system of the present disclosure enables but does not require the player to provide such player information before purchasing the draw lottery ticket.

In this first example embodiment, the self-service lottery ticket selling system 100 randomly selects the player numbers for the draw lottery game and the player does not have the ability to select the player numbers for the draw lottery ticket. In other embodiments, the self-service lottery ticket selling system of the present disclosure can enable the player to select and provide the player numbers for the draw lottery ticket.

In this first example embodiment, the self-service lottery ticket selling system 100 enables the player to purchase a draw lottery ticket for a single draw of the draw lottery game. In other embodiments, the self-service lottery ticket selling system of the present disclosure can enable but does not require the player to purchase a draw lottery ticket for multiple draws of the draw lottery game.

Second Set of Example Embodiments

The following describes another example self-service lottery ticket selling system 100 and method of operation of the self-service lottery ticket selling system 100 with reference to FIGS. 2A, 5A, 5B, 5C, 5D, 5E, 5F, 5G, 5H, and 5I. This example changes certain of the above described interfaces and adds additional functions to the self-service lottery ticket selling system 100 and method of operation described above with respect to the first set of example embodiments.

Figure 2A:
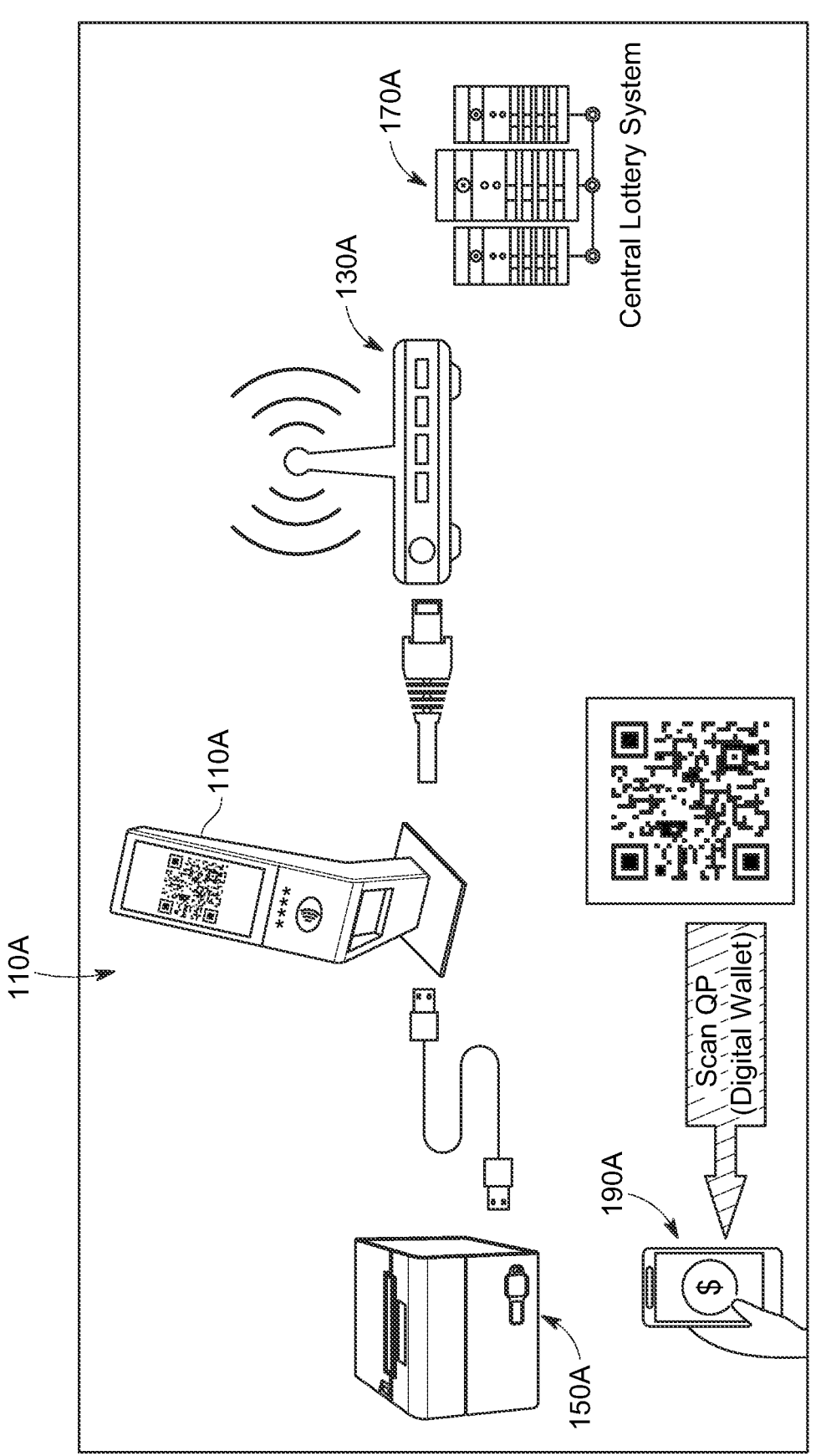
FIG. 2A is a diagrammatic view of a self-service lottery ticket selling system including a self-service lottery terminal, a lottery ticket printer, and a central lottery system, and that is operable with a player mobile device in accordance with one example embodiment of the present disclosure.

As shown in FIG. 2A, this illustrated example embodiment of the present disclosure provides a self-service lottery ticket selling system 100A including: (1) a self-service lottery terminal 110A; (2) a data receiver/transmitter 130A; (3) a lottery ticket printer 150A; and (4) a central lottery system 170A, wherein the self-service lottery terminal 110A is configured to display codes (such as QR codes) that can be scanned by a player electronic device such as a player mobile phone 190A.

As shown in FIGS. 5A, 5B, 5C, 5D, 5E, 5F, 5G, 5H, and 5I, in this example embodiment, the self-service lottery terminal 110A includes a base 112A, a housing 114A connected to an supported by the base 112A, a display device 116A mounted in and supported by the housing 114A, a code scanner 118A (such as but not limited to a barcode reader) mounted in and supported by the housing 114A, a wireless communicator 120A mounted in and supported by the housing 114A, and one or more connectors (not shown) configured to enable connection of the self-service lottery terminal 110A to other devices such as the data receiver/transmitter 130A and the lottery ticket printer 150A. In the example embodiment, the display device 116A includes a touch screen (not labeled) configured to receive inputs and thus the display device 116A also functions as an input device.

In this example embodiment, the self-service lottery terminal 110A is configured to cause the display device 116A thereof to display a draw lottery game default screen that includes the available draw lottery games and the respective available purchase amounts. In this example, the display device 116A of the self-service lottery terminal 110A displays three indications corresponding to three different draw lottery games (including in this example Draw Game 1, Draw Game 2, and Draw Game 3), as shown in FIG. 5A. In the example, the display device 116A of the self-service lottery terminal 110 also displays three indications corresponding to three different purchase amounts for each of the draw lottery games (not labelled), as also shown in FIG. 5A. The purchase amounts can be any suitable amounts.

Figure 5B:
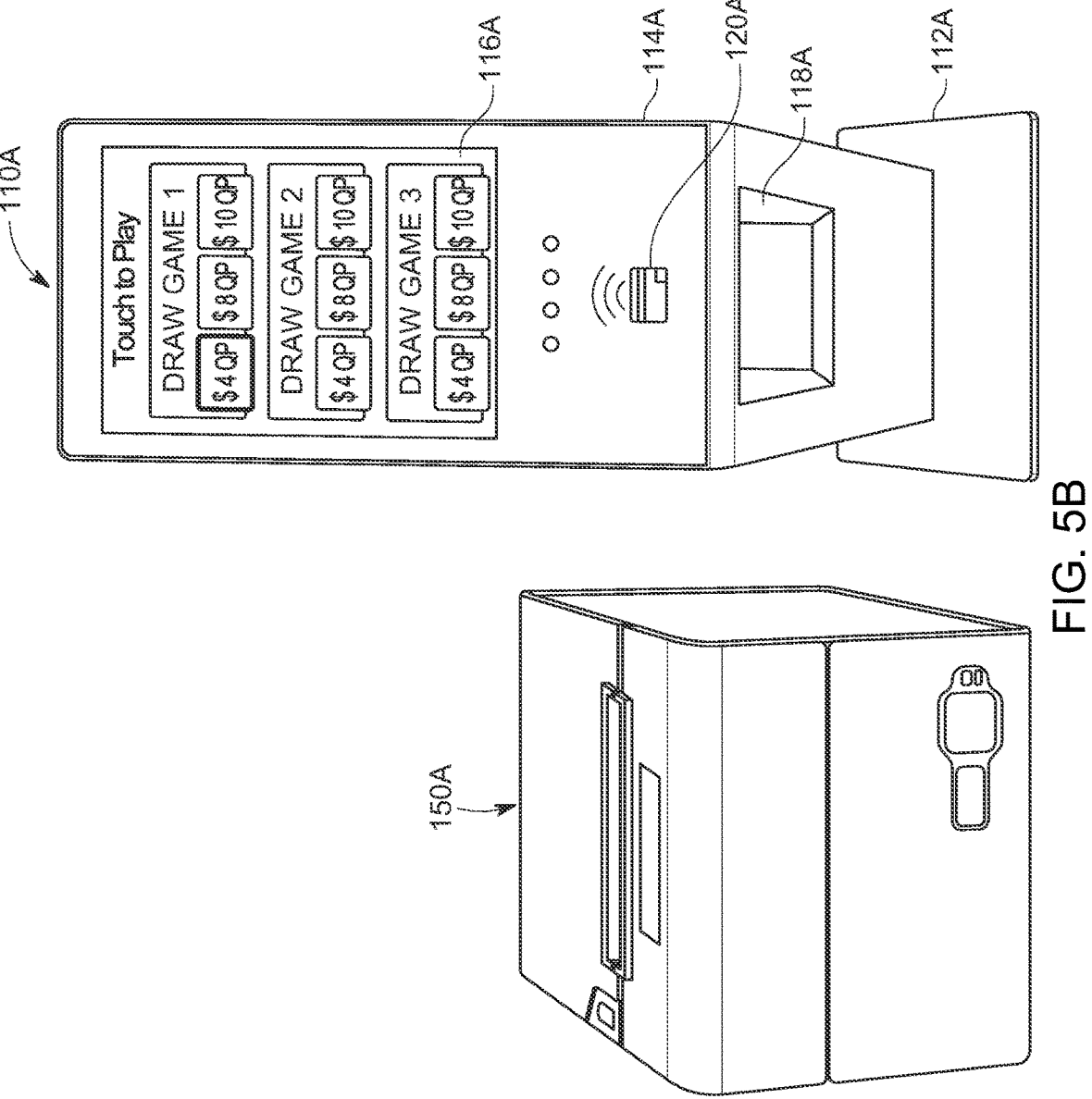

The self-service lottery terminal 110A is configured to receive a player input via the touch screen of the display device 116A indicating the selection of one of the displayed draw lottery games via the selection of one of the displayed purchase amounts for such draw lottery game, as shown in FIG. 5B. In this example, in response to receipt of such input, the display device 116A of the self-service lottery terminal 110A displays an indication corresponding to the player selected lowest purchase amount for the selected draw lottery game, as shown in FIG. 5B.

Figure 5C:
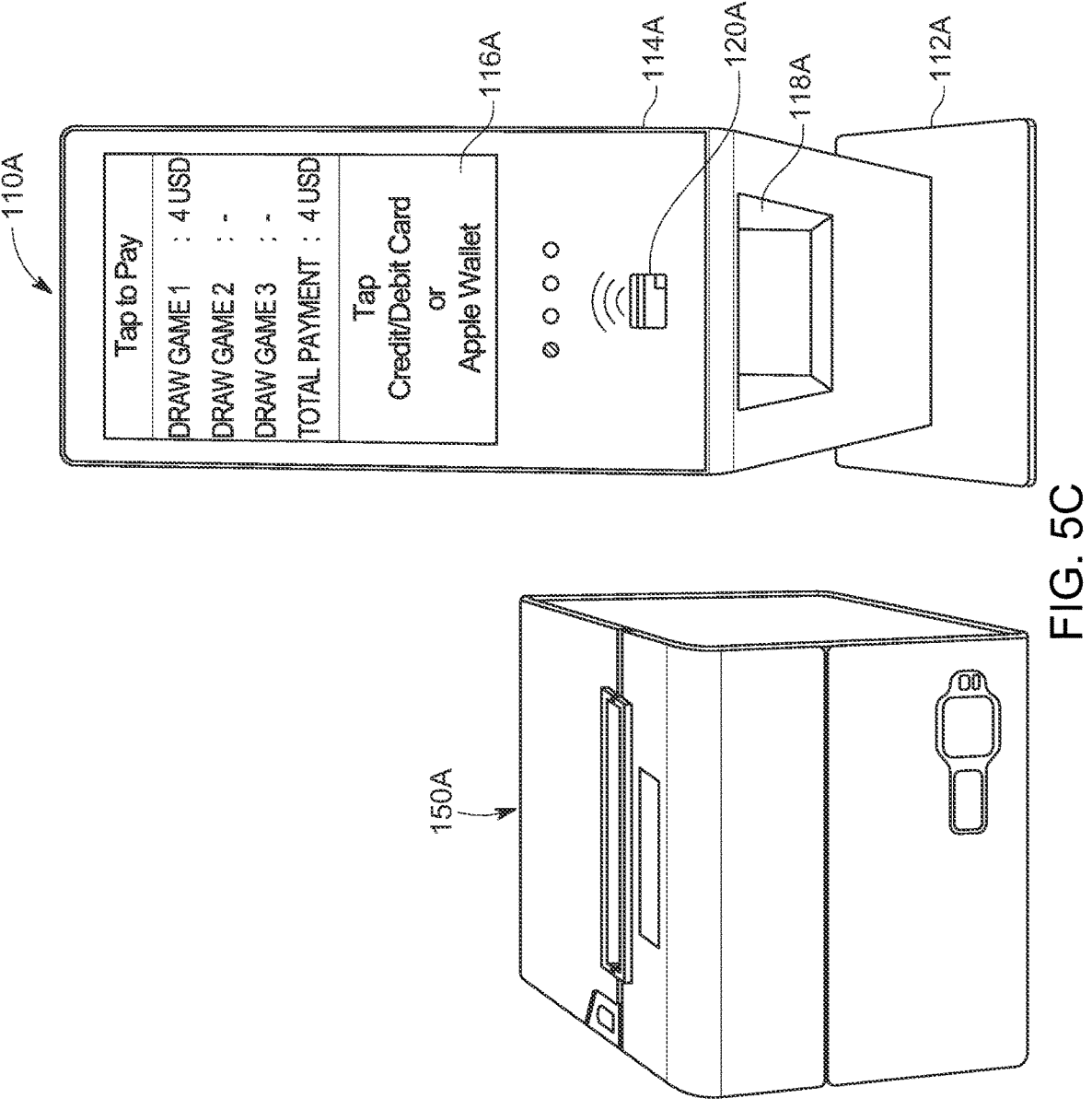

In this example, in response to receipt of such input, the display device 116A of the self-service lottery terminal 110A also displays payment instructions, as shown in FIG. 5C. In this example, the instructions provide: (1) "Tap to Pay"; (2) the selected game and selected amount; and (3) "Tap Credit/ Debit Card or Apple Wallet," to inform the player that the player can use a credit/debit card or their phone to pay for the draw lottery ticket, as shown in FIG. 5C. It should be appreciated that other electronic payment methods can be employed.

Figure 5D:
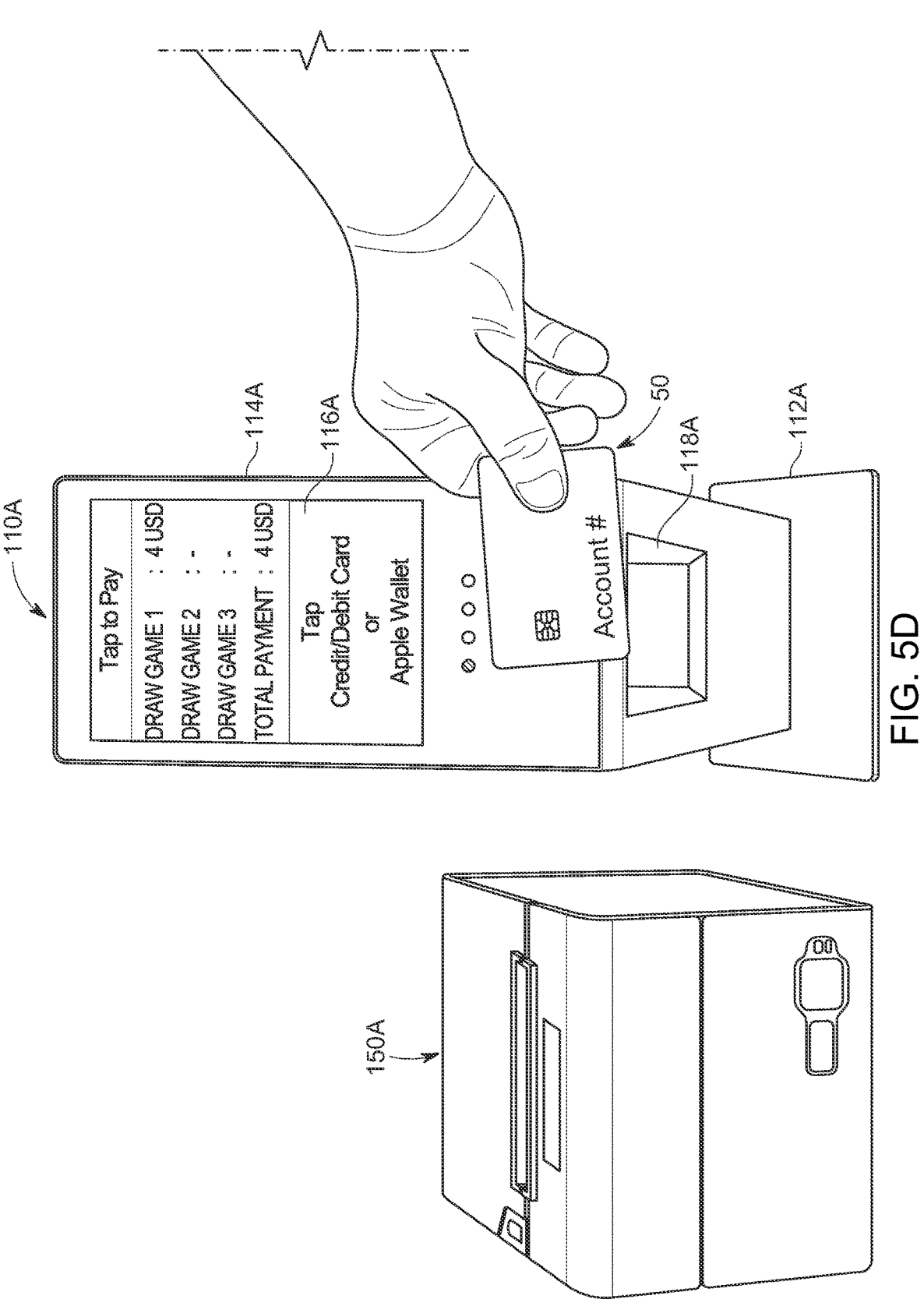

The self-service lottery terminal 110A is configured to receive a player input (such as a tap via a player card or phone) via the wireless communicator 120A to receive the purchase amount for the selected draw lottery game at the selected purchase amount from the player, and display a confirmation of payment received. In this example, the player uses a credit card 50 to pay, as shown in FIG. 5D.

In this example, the self-service lottery terminal 110A is configured to determine the numbers for the selected play of the draw lottery game for the draw lottery ticket for the player. In various embodiments, the self-service lottery terminal 110A determines such numbers. In various embodiments, the self-service lottery terminal 110A obtains the determined numbers from the central lottery system 170A.

Figure 5E:
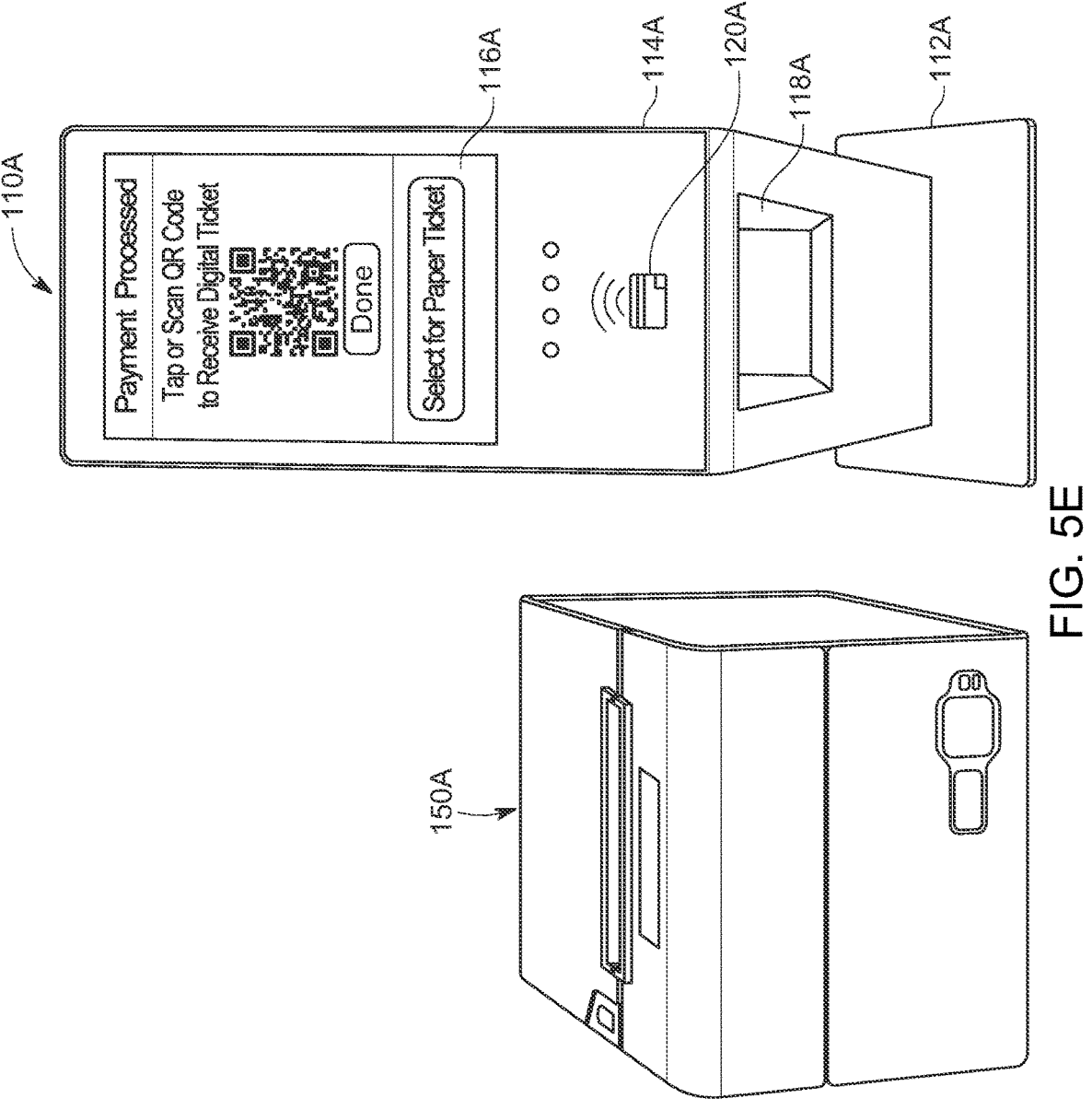

In this example, the self-service lottery terminal 110A is configured to provide the player a choice of how to obtain their draw lottery ticket, as shown in FIG. 5E. More specifically, in the example, the display device 116A of the self-service lottery terminal 110A simultaneously displays: (1) a code (which in this example is a QR code) that the player can scan using their mobile phone to obtain the draw lottery ticket on their mobile phone; and (2) an input that enables the player to receive a printed paper draw lottery ticket, as indicated in FIG. 5E.

Figure 5F:
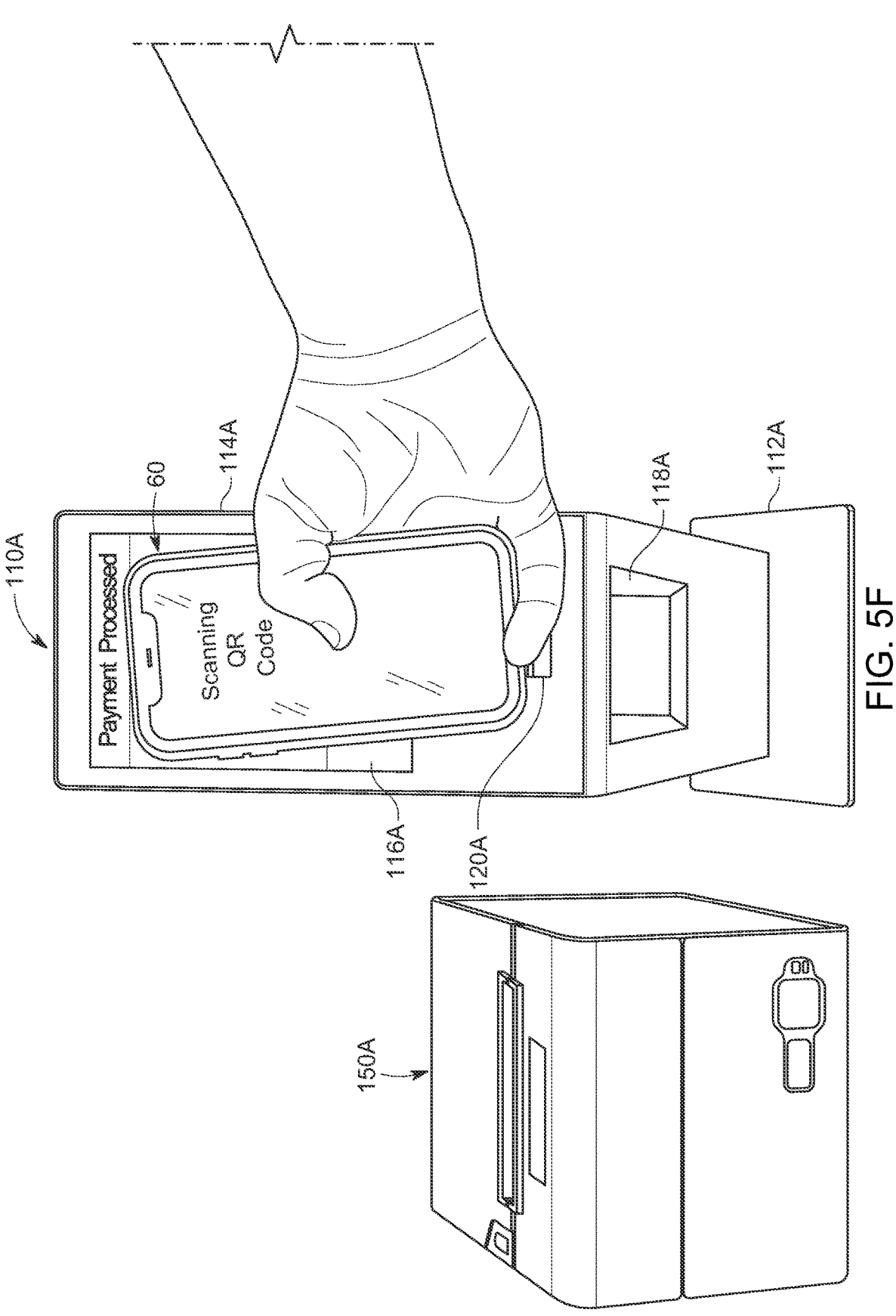
Figure 5G:
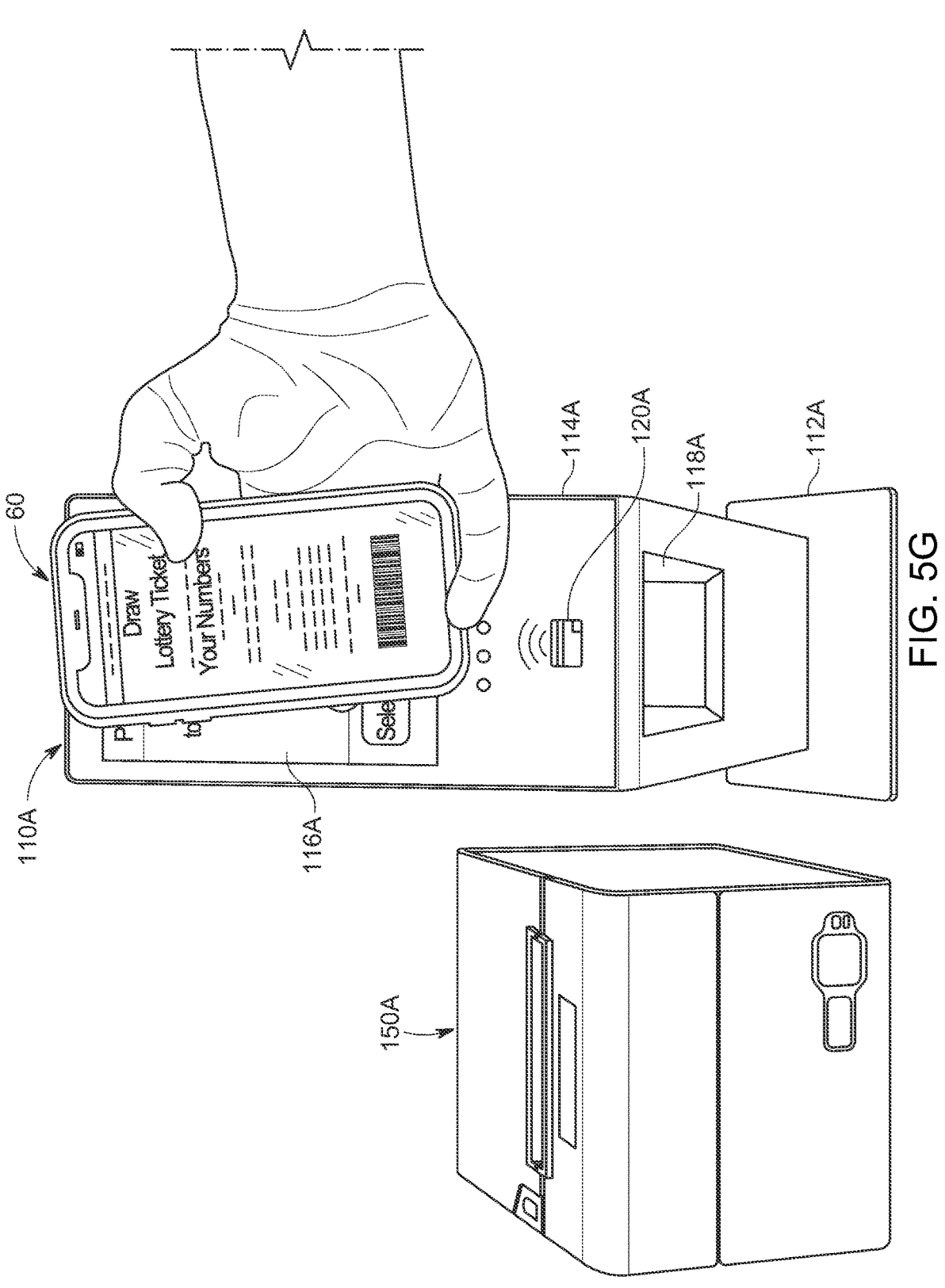

In a first example, the player uses the player's mobile phone to scan the code and to obtain the draw lottery ticket on their mobile phone 60, as shown in FIGS. 5F and 5G.

Figure 5H:
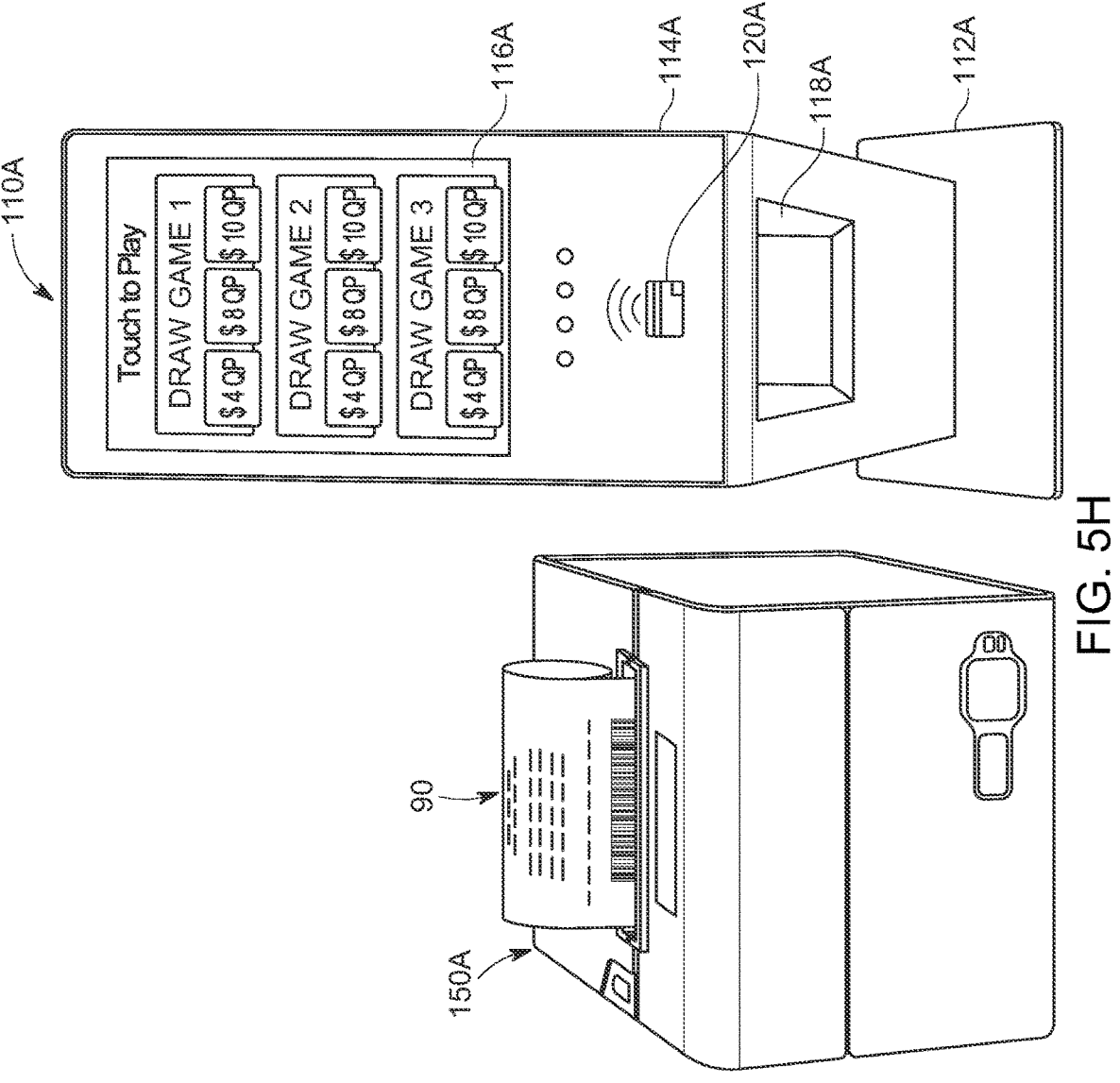
Figure 5I:
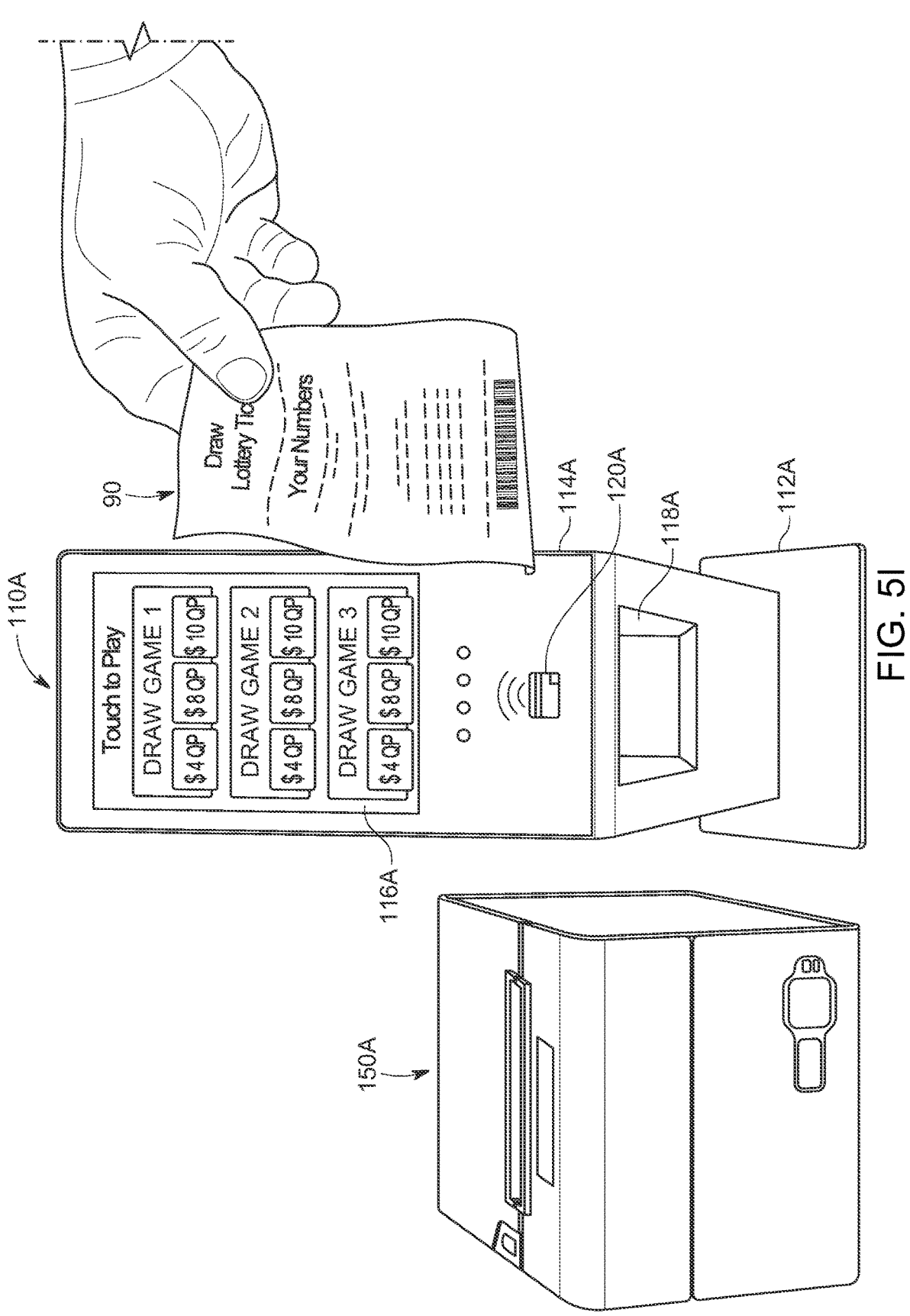

Alternatively, in this example, the player selects the input that enables the player to receive a printed paper draw lottery ticket and the self-service lottery terminal 110A causes the lottery ticket printer 150A to print the draw lottery ticket 90 that the player can then take, as shown in FIGS. 5H and 5I.

The self-service lottery terminal 110A is also configured to then return to the default screen, as shown in FIGS. 5H and 5I.

In this example embodiment, the self-service lottery ticket selling system 100A does not require the player to identify themselves to purchase the draw lottery ticket (other than somewhat indirectly via their payment device and related data). In other embodiments, the self-service lottery ticket selling system of the present disclosure can require the player to identify themselves via one or more different methods before purchasing the draw lottery ticket. In other embodiments, the self-service lottery ticket selling system of the present disclosure can enable but not require the player to identify themselves via one or more different methods before purchasing the draw lottery ticket. In various embodiments, the self-service lottery ticket selling system requires player identification for age verification purposes.

In this example embodiment, the self-service lottery ticket selling system 100A does not require the player provide an email address, phone number, player account information, or player information before purchasing the draw lottery ticket. In other embodiments, the self-service lottery ticket selling system of the present disclosure can require the player to provide such player information before purchasing the draw lottery ticket. In other embodiments, the self-service lottery ticket selling system of the present disclosure enables but does not require the player to provide such player information before purchasing the draw lottery ticket.

In this example embodiment, the self-service lottery ticket selling system 100 randomly selects the player numbers for the draw lottery game and the player does not have the ability to select the player numbers for the draw lottery ticket. In other embodiments, the self-service lottery ticket selling system of the present disclosure can enable the player to select and provide the player numbers for the draw lottery ticket.

In this example embodiment, the self-service lottery ticket selling system 100A enables the player to purchase a draw lottery ticket for a single draw of the draw lottery game. In other embodiments, the self-service lottery ticket selling system of the present disclosure can enable but does not require the player to purchase a draw lottery ticket for multiple draws of the draw lottery game.

Third Set of Example Embodiments

The following describes further example embodiments of the self-service lottery ticket selling system and method of operation of the self-service lottery ticket selling system in accordance with the present disclosure. These example embodiments change certain of the above described interfaces and function of the self-service lottery ticket selling system and method of operation described above with respect to the above example embodiments.

In various example embodiments, there is only one purchase amount associated with each draw lottery game and thus the self-service lottery ticket selling system and method of operation thereof only enables the player to select the draw lottery game and not one of a plurality of different purchase amounts. In such example embodiments, the self-service lottery ticket terminal displays an indication of the single purchase amount for each respective draw lottery game and thus does not enable the player to select the purchase amount.

Fourth Set of Example Embodiments

The following describes further example embodiments of the self-service lottery ticket selling system and method of operation of the self-service lottery ticket selling system in accordance with the present disclosure. These example embodiments change certain of the above described interfaces and add additional functions to the self-service lottery ticket selling system and method of operation described above with respect to the above example embodiments.

In various example embodiments, before the player can select a draw lottery ticket to purchase (and the purchase amount if applicable), the self-service lottery ticket selling system requires the player to identify themselves in one or more predetermined manners. The identification can be for age verification and/or other reasons.

In various example embodiments, before the player can select a draw lottery ticket to purchase (and the purchase amount if applicable), the self-service lottery ticket selling system requires the player to identify themselves via entering player account information for the player.

In various such embodiments, the self-service lottery ticket terminal displays via its display device an input interface that enables the player to enter suitable account information (such as an account number, player id, passcode, etc.) for providing identification of the player.

In various such embodiments, the self-service lottery ticket terminal enables the player to display a code such as via the player's mobile devices and present that code under the scanner of the self-service lottery ticket terminal so that the scanner can scan that code, and such that the self-service lottery ticket terminal can use that scan code to access the player account and obtain player related information.

In various such embodiments, the player mobile phone or other player electronic device (such as an electronic smartphone, an electronic tablet, an electronic watch, or other suitable electronic computing device with suitable data communication, user input, and display functions) can be employed. The player mobile phone is used as an example herein. The player mobile phone can have an application downloaded thereon. The application downloaded on the player mobile phone is configured to enable a player to use the application on the player mobile phone to set up a player account with the central lottery system. After the account is set up, the player mobile phone can be used to display a code associated with the player account so that the player can identify themselves via the player account.

The use of such player account can facilitate the self-service lottery ticket selling system satisfying verification of the minimum age requirement for the player for purchasing the draw lottery ticket. Specifically, the player account creation process can require the player to provide proof of age information that is stored in association with the player account. Thus, in various such embodiments, the player account can be strictly for player identification (including age verification).

In various further embodiments, the player account can also be configured for the receipt and storage of electronic draw lottery tickets purchased by the player. Thus, such account can be used to receive the electronic draw lottery tickets purchased by the player via the self-service lottery terminal, store those electronic draw lottery tickets for the player, enable the player to retrieve and display the draw lottery tickets on their player mobile phone (such as for checking such tickets and for redemption of such tickets).

In various further embodiments, the player account can also or alternatively be configured for handling of player funds. For example, the player account can be configured for: (1) enabling the deposit of funds by the player to the player account; (2) the withdrawal of funds by the player from the player account; (3) the use funds in the player account to pay for a draw lottery ticket for a draw lottery game; and/or (4) the deposit of funds (up to a suitable limit) from a redemption of a winning draw lottery ticket associated with the player account.

In various further embodiments, the player account can also or alternatively be configured for the selection of player numbers for a play of the draw lottery game. For example, the player account can be configured for: (1) the player inputting a selection of a draw lottery game; and (2) the player's selected numbers for the draw lottery ticket for the draw lottery game.

In various example embodiments, before the player can select a draw lottery ticket to purchase (and the purchase amount if applicable), the self-service lottery ticket selling system requires the player to identify themselves via a player ID code created via a player account system or other system.

Fifth Set of Example Embodiments

The following describes further example embodiments of the self-service lottery ticket selling system and method of operation of the self-service lottery ticket selling system in accordance with the present disclosure. These example embodiments change certain of the above described interfaces and add additional functions to the self-service lottery ticket selling system and method of operation described above with respect to the above example embodiments.

In various example embodiments, the self-service lottery ticket selling system enables the player to select the player's numbers for the play of the draw lottery game. For example, the self-service lottery terminal can be configured to display an interface that enables the player to input a selection of a draw lottery game and the player's selected numbers for the draw lottery ticket for the draw lottery game.

In various example embodiments, the player can use an application on then player's phone to select the player numbers for a play of a draw lottery game and the self-service lottery terminal can be used to scan a code associated with those player selected numbers to obtain the player's selected numbers for the draw lottery ticket for the draw lottery game.

In various example embodiments, the self-service lottery ticket selling system enables the player to use a previously purchased draw lottery ticket to select the player's numbers for the play of the draw lottery game. For example, the self-service lottery terminal can be configured to scan a previously purchased draw lottery ticket presented by the player to obtain the player's selected numbers for the draw lottery ticket for the draw lottery game. These example embodiments essentially enable a replay of the previously purchased draw lottery ticket.

Sixth Set of Example Embodiments

The following describes further example embodiments of the self-service lottery ticket selling system and method of operation of the self-service lottery ticket selling system in accordance with the present disclosure. These example embodiments changes certain of the above described interfaces and add additional functions to the self-service lottery ticket selling system and method of operation described above with respect to the above example embodiments. In various example embodiments, the self-service lottery terminal is in a kiosk type form and the self-service lottery terminal and lottery ticket printer are combined into one housing.

It should be appreciated from the above that various embodiments of the present disclosure provide a self-service lottery ticket selling system comprising: (1) a lottery ticket printer configured to print draw lottery tickets; (2) a data receiver/transmitter configured to communicate with a central lottery system via a data communication network; and (3) a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer, wherein the self-service lottery terminal is configured to enable a purchase of a draw lottery ticket by a player without the assistance of any operator of the self-service lottery terminal.

In various such embodiments, wherein the self-service lottery terminal is configured to: simultaneously display, via the display device, an indication corresponding to a draw lottery game and different purchase amounts for a play of the draw lottery game; display, via the display device, an indication of one of the purchase amounts for the play of the draw lottery game corresponding to a player input via the touch screen of the display device indicating a selection of that purchase amount for the play of the draw lottery game; display, via the display device, payment instructions for that purchase amount for the play of the draw lottery game; display, via the display device, a payment confirmation for that purchase amount for the draw lottery game after receiving a player input via the wireless communicator for that purchase amount for the play of the draw lottery game; and cause the lottery ticket printer to print a draw lottery ticket for the play of the draw lottery game. In various such embodiments, the self-service lottery terminal is configured to determine the numbers for the play of the draw lottery game. In various such embodiments, the self-service lottery terminal is configured to receive the numbers for the play of the draw lottery game.

In various such embodiments, the self-service lottery terminal is configured to: display, via the display device, an indication corresponding to a draw lottery game; display, via the display device, indications of different purchase amounts for a play of the draw lottery game after a player input via the touch screen of the display device indicating a player selection of the draw lottery game; display, via the display device, an indication of one of the purchase amounts for the play of the draw lottery game corresponding to a player input via the touch screen of the display device indicating a selection of that purchase amount for the play of the draw lottery game; display, via the display device, payment instructions for that purchase amount for the play of the draw lottery game; display, via the display device, a payment confirmation for that purchase amount for the play of the draw lottery game after receiving a player input via the wireless communicator for that purchase amount for the play of the draw lottery game; and cause the lottery ticket printer to print a draw lottery ticket for the play of the draw lottery game. In various such embodiments, the self-service lottery terminal is configured to determine the numbers for the play of the draw lottery game. In various such embodiments, the self-service lottery terminal is configured to receive the numbers for the play of the draw lottery game.

In various such embodiments, the self-service lottery terminal is configured to: simultaneously display, via the display device, indications corresponding to different draw lottery games and different purchase amounts for each of the draw lottery games; display, via the display device, an indication of one of the purchase amounts for a play of one of the draw lottery games corresponding to a player input via the touch screen of the display device indicating a selection of that purchase amount for the play of the draw lottery game, wherein the player input also indicates a selection of the draw lottery game; display, via the display device, payment instructions for that purchase amount for the play of the draw lottery game; display, via the display device, a payment confirmation for that purchase amount for the draw lottery game after receiving a player input via the wireless communicator for that purchase amount for the play of the draw lottery game; and cause the lottery ticket printer to print a draw lottery ticket for the play of the draw lottery game. In various such embodiments, the self-service lottery terminal is configured to determine the numbers for the play of the draw lottery game. In various such embodiments, the self-service lottery terminal is configured to receive the numbers for the play of the draw lottery game.

In various such embodiments, the self-service lottery terminal is configured to: display, via the display device, indications corresponding to different draw lottery games; display, via the display device, an indication of different purchase amounts for a play of one of the draw lottery games corresponding to a player input via the touch screen of the display device indicating a selection of that draw lottery game; display, via the display device, an indication of one of the purchase amounts for the play of the draw lottery game corresponding to a player input via the touch screen of the display device indicating a selection of that purchase amount for the play of the draw lottery game; display, via the display device, payment instructions for that purchase amount for the play of the draw lottery game; display, via the display device, a payment confirmation for that purchase amount for the draw lottery game after receiving a player input via the wireless communicator for that purchase amount for the play of the draw lottery game; and cause the lottery ticket printer to print a draw lottery ticket for the play of the draw lottery game. In various such embodiments, the self-service lottery terminal is configured to determine the numbers for the play of the draw lottery game. In various such embodiments, the self-service lottery terminal is configured to receive the numbers for the play of the draw lottery game.

In various such embodiments, the self-service lottery terminal is configured enable the player to identify themselves prior to the purchase the draw lottery ticket.

In various such embodiments, the self-service lottery terminal is configured to receive the numbers for the draw lottery ticket from a previous lottery ticket.

It should further be appreciated from the above that various embodiments of the present disclosure provide a self-service lottery ticket selling system comprising: (1) a lottery ticket printer configured to print draw lottery tickets; (2) a data receiver/transmitter configured to communicate with a central lottery system via a data communication network; and (3) a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer. The self-service lottery terminal is configured to: enable a purchase of a draw lottery ticket by a player without the assistance of any operator of the self-service lottery terminal; display, via the display device, an indication of an input configured to cause the draw lottery ticket to be printed by the lottery ticket printer; and display, via the display device, a code readable by an electronic player device that enables the player electronic device to cause the draw lottery ticket to be downloaded.

In various such embodiments, the self-service lottery terminal is configured to simultaneously display the indication of the input configured to cause the draw lottery ticket to be printed by the lottery ticket printer and the code readable by the electronic player device that enables the player electronic device to cause the draw lottery ticket to be downloaded.

It should further be appreciated from the above that various embodiments of the present disclosure provide a self-service lottery ticket selling system comprising: (1) a lottery ticket printer configured to print draw lottery tickets; (2) a data receiver/transmitter configured to communicate with a central lottery system via a data communication network; and (3) a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/ transmitter and to the lottery ticket printer The self-service lottery terminal is configured to: simultaneously display, via the display device, indications corresponding to different draw lottery games and different purchase amounts for the draw lottery games; display, via the display device, an indication of one of the purchase amounts for a play of one of the draw lottery games corresponding to a player input via the touch screen of the display device indicating a selection of that purchase amount for the play of the draw lottery game, wherein the player input also indicates a selection of the draw lottery game; determine the numbers for the play of the draw lottery game or receive the numbers for the play of the draw lottery game; display, via the display device, payment instructions for that purchase amount for the play of the draw lottery game; display, via the display device, a payment confirmation for that purchase amount for the draw lottery game after receiving a player input via the wireless communicator for that purchase amount for the play of the draw lottery game; simultaneously display, via the display device, an indication of an input configured to cause the draw lottery ticket to be printed by the lottery ticket printer, and a code readable by an electronic player device that enables the player electronic device to cause the draw lottery ticket to be downloaded; and cause the lottery ticket printer to print the draw lottery ticket for the play of the draw lottery game responsive to a player input to cause the draw lottery ticket to be printed by the lottery ticket printer. In various such embodiments, the self-service lottery terminal is configured enable the player to identify themselves prior to the purchase the draw lottery ticket. In various such embodiments, the self-service lottery terminal is configured to receive the numbers for the play of the draw lottery game from a previous lottery ticket.

It should also be appreciated from the above that these various example embodiments of the present disclosure provide a technical advantage by enabling the purchase of draw lottery tickets without the need for human operators of the lottery terminal.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A self-service lottery ticket selling system comprising:
   a lottery ticket printer configured to print draw lottery tickets;
   a data receiver/transmitter configured to communicate with a central lottery system via a data communication network; and
   a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer, wherein the self-service lottery terminal is configured to enable a purchase of a draw lottery ticket by a player without assistance of any operator of the self-service lottery terminal, wherein the self-service lottery terminal is configured to:
      display, via the display device, an indication of an input configured to cause the draw lottery ticket to be printed by the lottery ticket printer; and display, via the display device, a code readable by an electronic player device that enables the player electronic device to cause the draw lottery ticket to be downloaded.

2. The lottery ticket selling system of claim 1, wherein the self-service lottery terminal is configured to:

simultaneously display, via the display device, an indication corresponding to a draw lottery game and different purchase amounts for a play of the draw lottery game;

display, via the display device, an indication of one of the purchase amounts for the play of the draw lottery game corresponding to a player input via the touch screen of the display device indicating a selection of that purchase amount for the play of the draw lottery game;

display, via the display device, payment instructions for that purchase amount for the play of the draw lottery game; and display, via the display device, a payment confirmation for that purchase amount for the draw lottery game after receiving a player input via the wireless communicator for that purchase amount for the play of the draw lottery game.

3. The lottery ticket selling system of claim 2, wherein the self-service lottery terminal is configured to determine numbers for the play of the draw lottery game.

4. The lottery ticket selling system of claim 2, wherein the self-service lottery terminal is configured to receive numbers for the play of the draw lottery game.

5. The lottery ticket selling system of claim 1, wherein the self-service lottery terminal is configured to:

display, via the display device, an indication corresponding to a draw lottery game;

display, via the display device, indications of different purchase amounts for a play of the draw lottery game after a player input via the touch screen of the display device indicating a player selection of the draw lottery game;

display, via the display device, an indication of one of the purchase amounts for the play of the draw lottery game corresponding to a player input via the touch screen of the display device indicating a selection of that purchase amount for the play of the draw lottery game;

display, via the display device, payment instructions for that purchase amount for the play of the draw lottery game; and display, via the display device, a payment confirmation for that purchase amount for the play of the draw lottery game after receiving a player input via the wireless communicator for that purchase amount for the play of the draw lottery game.

6. The lottery ticket selling system of claim 5, wherein the self-service lottery terminal is configured to determine numbers for the play of the draw lottery game.

7. The lottery ticket selling system of claim 5, wherein the self-service lottery terminal is configured to receive numbers for the play of the draw lottery game.

8. The lottery ticket selling system of claim 1, wherein the self-service lottery terminal is configured to:

simultaneously display, via the display device, indications corresponding to different draw lottery games and different purchase amounts for each of the draw lottery games;

display, via the display device, an indication of one of the purchase amounts for a play of one of the draw lottery games corresponding to a player input via the touch screen of the display device indicating a selection of that purchase amount for the play of the draw lottery game, wherein the player input also indicates a selection of the draw lottery game;

display, via the display device, payment instructions for that purchase amount for the play of the draw lottery game; and display, via the display device, a payment confirmation for that purchase amount for the draw lottery game after receiving a player input via the wireless communicator for that purchase amount for the play of the draw lottery game.

9. The lottery ticket selling system of claim 8, wherein the self-service lottery terminal is configured to determine numbers for the play of the draw lottery game.

10. The lottery ticket selling system of claim 8, wherein the self-service lottery terminal is configured to receive numbers for the play of the draw lottery game.

11. The lottery ticket selling system of claim 1, wherein the self-service lottery terminal is configured to:

display, via the display device, indications corresponding to different draw lottery games;

display, via the display device, an indication of different purchase amounts for a play of one of the draw lottery games corresponding to a player input via the touch screen of the display device indicating a selection of that draw lottery game;

display, via the display device, an indication of one of the purchase amounts for the play of the draw lottery game corresponding to a player input via the touch screen of the display device indicating a selection of that purchase amount for the play of the draw lottery game;

display, via the display device, payment instructions for that purchase amount for the play of the draw lottery game; and display, via the display device, a payment confirmation for that purchase amount for the draw lottery game after receiving a player input via the wireless communicator for that purchase amount for the play of the draw lottery game.

12. The lottery ticket selling system of claim 11, wherein the self-service lottery terminal is configured to determine numbers for the play of the draw lottery game.

13. The lottery ticket selling system of claim 11, wherein the self-service lottery terminal is configured to receive numbers for the play of the draw lottery game.

14. The lottery ticket selling system of claim 1, wherein the self-service lottery terminal is configured enable the player to identify themselves prior to the purchase of the draw lottery ticket.

15. The lottery ticket selling system of claim 1, wherein the self-service lottery terminal is configured to receive numbers for the draw lottery ticket from a previous lottery ticket.

16. A self-service lottery ticket selling system comprising:

a lottery ticket printer configured to print draw lottery tickets;

a data receiver/transmitter configured to communicate with a central lottery system via a data communication network; and a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer, wherein the self-service lottery terminal is configured to:

enable a purchase of a draw lottery ticket by a player without assistance of any operator of the self-service lottery terminal;

display, via the display device, an indication of an input configured to cause the draw lottery ticket to be printed by the lottery ticket printer; and display, via the display device, a code readable by an electronic player device that enables the player electronic device to cause the draw lottery ticket to be downloaded.

17. The lottery ticket selling system of claim 16, wherein the self-service lottery terminal is configured to simultaneously display the indication of the input configured to cause the draw lottery ticket to be printed by the lottery ticket printer and the code readable by the electronic player device that enables the player electronic device to cause the draw lottery ticket to be downloaded.

18. A self-service lottery ticket selling system comprising:

a lottery ticket printer configured to print draw lottery tickets;

a data receiver/transmitter configured to communicate with a central lottery system via a data communication network; and a self-service lottery terminal including a housing, a display device having a touch screen and supported by the housing, a code scanner supported by the housing, a wireless communicator supported by the housing, and one or more connectors configured to enable connection of the self-service lottery terminal to the data receiver/transmitter and to the lottery ticket printer, wherein the self-service lottery terminal is configured to:

simultaneously display, via the display device, indications corresponding to different draw lottery games and different purchase amounts for the draw lottery games;

display, via the display device, an indication of one of the purchase amounts for a play of one of the draw lottery games corresponding to a player input via the touch screen of the display device indicating a selection of that purchase amount for the play of the draw lottery game, wherein the player input also indicates a selection of the draw lottery game;

determine numbers for the play of the draw lottery game or receive the numbers for the play of the draw lottery game;

display, via the display device, payment instructions for that purchase amount for the play of the draw lottery game;

display, via the display device, a payment confirmation for that purchase amount for the draw lottery game after receiving a player input via the wireless communicator for that purchase amount for the play of the draw lottery game;

simultaneously display, via the display device, an indication of an input configured to cause the draw lottery ticket to be printed by the lottery ticket printer, and a code readable by an electronic player device that enables the player electronic device to cause the draw lottery ticket to be downloaded; and cause the lottery ticket printer to print the draw lottery ticket for the play of the draw lottery game responsive to a player input to cause the draw lottery ticket to be printed by the lottery ticket printer.

19. The lottery ticket selling system of claim 18 wherein the self-service lottery terminal is configured enable the player to identify themselves prior to the purchase of the draw lottery ticket.

20. The lottery ticket selling system of claim 18, wherein the self-service lottery terminal is configured to receive the numbers for the play of the draw lottery game from a previous lottery ticket.

* * * * *